(12) United States Patent
Prevost et al.

(10) Patent No.: US 12,006,973 B2
(45) Date of Patent: Jun. 11, 2024

(54) DIAMOND SURFACE BEARINGS FOR SLIDING ENGAGEMENT WITH METAL SURFACES

(71) Applicant: Pi Tech Innovations LLC, Houston, TX (US)

(72) Inventors: Gregory Prevost, Spring, TX (US); Edward C. Spatz, Spring, TX (US)

(73) Assignee: Pi Tech Innovations LLC, Houston, TX (US)

( * ) Notice: Subject to any disclaimer, the term of this patent is extended or adjusted under 35 U.S.C. 154(b) by 0 days.

(21) Appl. No.: 17/522,377

(22) Filed: Nov. 9, 2021

(65) Prior Publication Data

US 2022/0145934 A1 May 12, 2022

Related U.S. Application Data

(60) Provisional application No. 63/111,147, filed on Nov. 9, 2020.

(51) Int. Cl.
*F16C 33/04* (2006.01)
*F16C 33/26* (2006.01)

(52) U.S. Cl.
CPC .......... *F16C 33/046* (2013.01); *F16C 33/043* (2013.01); *F16C 33/26* (2013.01); *F16C 2240/54* (2013.01); *F16C 2361/91* (2013.01)

(58) Field of Classification Search
CPC ...... F16C 17/02; F16C 17/022; F16C 33/043; F16C 33/046; F16C 33/26; F16C 2206/04; F16C 2240/54; F16C 2361/91; E21B 4/003
See application file for complete search history.

(56) References Cited

U.S. PATENT DOCUMENTS

| | | |
|---|---|---|
| 2,693,396 A | 11/1954 | Gondek |
| 2,947,609 A | 8/1960 | Strong |
| 2,947,610 A | 8/1960 | Hall et al. |
| 3,132,904 A | 5/1964 | Kohei et al. |
| 3,582,161 A | 6/1971 | Hudson |
| 3,603,652 A | 9/1971 | Youden |
| 3,650,714 A | 3/1972 | Farkas |
| 3,745,623 A | 7/1973 | Wentorf et al. |
| 3,752,541 A | 8/1973 | Mcvey |
| 3,866,987 A | 2/1975 | Garner |

(Continued)

FOREIGN PATENT DOCUMENTS

| | | |
|---|---|---|
| CA | 1286655 C | 7/1991 |
| CN | 101273151 B | 12/2011 |

(Continued)

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.

(Continued)

*Primary Examiner* — Alan B Waits
(74) *Attorney, Agent, or Firm* — Michael S. McCoy; Amatong McCoy LLC

(57) ABSTRACT

Bearings and valves are provided that include diamond engagement surfaces that are engaged with opposing, metal engagement surfaces that include diamond solvent-catalyst. Also provided are methods of making and using the bearings and valves.

48 Claims, 7 Drawing Sheets

(56) References Cited

U.S. PATENT DOCUMENTS

| | | |
|---|---|---|
| 3,920,290 A | 11/1975 | Evarts |
| 4,085,634 A | 4/1978 | Sattler |
| 4,225,322 A | 9/1980 | Knemeyer |
| 4,275,935 A | 6/1981 | Thompson et al. |
| 4,285,550 A | 8/1981 | Blackburn et al. |
| 4,382,637 A | 5/1983 | Blackburn et al. |
| 4,410,054 A | 10/1983 | Nagel et al. |
| 4,410,284 A | 10/1983 | Herrick |
| 4,468,138 A | 8/1984 | Nagel |
| 4,525,178 A | 6/1985 | Hall |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,738,322 A | 4/1988 | Hall et al. |
| 4,764,036 A | 8/1988 | McPherson |
| 4,797,011 A | 1/1989 | Saeki et al. |
| 4,906,528 A | 3/1990 | Cerceau et al. |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,151,107 A | 9/1992 | Cho et al. |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,364,192 A | 11/1994 | Damm et al. |
| 5,385,715 A | 1/1995 | Fish |
| 5,447,208 A | 9/1995 | Lund et al. |
| 5,462,362 A | 10/1995 | Yuhta et al. |
| 5,514,183 A | 5/1996 | Epstein et al. |
| 5,540,314 A | 7/1996 | Coelln |
| 5,560,716 A | 10/1996 | Tank et al. |
| 5,645,617 A | 7/1997 | Frushour |
| 5,653,300 A | 8/1997 | Lund et al. |
| 5,855,996 A | 1/1999 | Corrigan et al. |
| 5,948,541 A | 9/1999 | Inspektor |
| 6,045,029 A | 4/2000 | Scott |
| 6,164,109 A | 12/2000 | Bartosch |
| 6,190,050 B1 | 2/2001 | Campbell |
| 6,209,185 B1 | 4/2001 | Scott |
| 6,409,388 B1 | 6/2002 | Lin |
| 6,488,103 B1 | 12/2002 | Dennis et al. |
| 6,488,715 B1 | 12/2002 | Pope et al. |
| 6,517,583 B1 | 2/2003 | Pope et al. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,814,775 B2 | 11/2004 | Scurlock et al. |
| 6,951,578 B1 | 10/2005 | Belnap et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,080,071 B1 | 12/2011 | Vail |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,435,317 B2 | 5/2013 | Burgess et al. |
| 8,480,304 B1 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,702,824 B1 | 4/2014 | Sani et al. |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,789,281 B1 | 7/2014 | Sexton et al. |
| 8,833,635 B1 | 9/2014 | Peterson |
| 8,881,849 B2 | 11/2014 | Shen et al. |
| 8,911,521 B1 | 12/2014 | Miess et al. |
| 8,939,652 B2 | 1/2015 | Peterson et al. |
| 8,974,559 B2 | 3/2015 | Frushour |
| 9,004,198 B2 | 4/2015 | Kulkarni |
| 9,022,149 B2 | 5/2015 | Lyons |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,151,326 B1 | 10/2015 | Peterson et al. |
| 9,273,381 B2 | 3/2016 | Qian et al. |
| 9,284,980 B1 | 3/2016 | Miess |
| 9,309,923 B1 | 4/2016 | Lingwall et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,611,885 B1 | 4/2017 | Cooley et al. |
| 9,643,293 B1 | 5/2017 | Miess et al. |
| 9,702,198 B1 | 7/2017 | Topham |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,822,523 B1 | 11/2017 | Miess |
| 10,018,146 B2 | 7/2018 | Azevedo et al. |
| 10,060,192 B1 | 8/2018 | Miess et al. |
| 10,113,362 B2 | 10/2018 | Ritchie et al. |
| 10,279,454 B2 | 5/2019 | DiGiovanni et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1 * | 11/2019 | Miess ............... F01L 1/14 |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |
| 10,807,913 B2 | 10/2020 | Hawks et al. |
| 10,968,700 B1 | 4/2021 | Raymond |
| 10,968,703 B2 | 4/2021 | Haugvaldstad et al. |
| 11,054,000 B2 | 7/2021 | Prevost et al. |
| 11,085,488 B2 | 8/2021 | Gonzalez |
| 11,118,408 B2 | 9/2021 | Marshall et al. |
| 11,802,443 B2 | 10/2023 | Peters |
| 2003/0019106 A1 | 1/2003 | Pope et al. |
| 2003/0075363 A1 | 4/2003 | Lin et al. |
| 2003/0220691 A1 | 11/2003 | Songer et al. |
| 2004/0031625 A1 | 2/2004 | Lin et al. |
| 2004/0134687 A1 | 7/2004 | Radford et al. |
| 2004/0219362 A1 | 11/2004 | Wort et al. |
| 2004/0223676 A1 | 11/2004 | Pope et al. |
| 2006/0060392 A1 | 3/2006 | Eyre |
| 2006/0165973 A1 | 7/2006 | Dumm et al. |
| 2007/0046119 A1 | 3/2007 | Cooley |
| 2008/0085407 A1 | 4/2008 | Cooley et al. |

(56) References Cited

U.S. PATENT DOCUMENTS

| | | |
|---|---|---|
| 2008/0253706 A1 | 10/2008 | Bischof et al. |
| 2009/0060408 A1 | 3/2009 | Nagasaka et al. |
| 2009/0087563 A1 | 4/2009 | Voegele et al. |
| 2009/0268995 A1 | 10/2009 | Ide et al. |
| 2010/0061676 A1 | 3/2010 | Sugiyama et al. |
| 2010/0276200 A1 | 11/2010 | Schwefe et al. |
| 2010/0307069 A1 | 12/2010 | Bertagnolli et al. |
| 2011/0174547 A1 | 7/2011 | Sexton et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | DiGiovanni et al. |
| 2012/0281938 A1 | 11/2012 | Peterson et al. |
| 2013/0004106 A1 | 1/2013 | Wenzel |
| 2013/0092454 A1 | 4/2013 | Scott et al. |
| 2013/0140093 A1 | 6/2013 | Zhou et al. |
| 2013/0146367 A1 | 6/2013 | Zhang et al. |
| 2013/0170778 A1 | 7/2013 | Higginbotham et al. |
| 2014/0037232 A1 | 2/2014 | Marchand et al. |
| 2014/0105739 A1* | 4/2014 | Peterson ............... F16C 17/028 384/306 |
| 2014/0254967 A1 | 9/2014 | Gonzalez |
| 2014/0341487 A1 | 11/2014 | Cooley et al. |
| 2014/0355914 A1 | 12/2014 | Cooley et al. |
| 2015/0027713 A1 | 1/2015 | Penisson |
| 2015/0079349 A1 | 3/2015 | Russell et al. |
| 2015/0132539 A1 | 5/2015 | Bailey et al. |
| 2015/0337949 A1 | 11/2015 | Ziegler et al. |
| 2016/0153243 A1 | 6/2016 | Hinz et al. |
| 2016/0186363 A1 | 6/2016 | Merzaghi et al. |
| 2016/0312535 A1 | 10/2016 | Ritchie et al. |
| 2017/0108039 A1 | 4/2017 | Hall et al. |
| 2017/0138224 A1 | 5/2017 | Henry et al. |
| 2017/0234071 A1 | 8/2017 | Spatz et al. |
| 2017/0261031 A1 | 9/2017 | Gonzalez et al. |
| 2018/0087134 A1 | 3/2018 | Chang et al. |
| 2018/0209476 A1 | 7/2018 | Gonzalez |
| 2018/0216661 A1 | 8/2018 | Gonzalez |
| 2018/0264614 A1 | 9/2018 | Winkelmann et al. |
| 2018/0320740 A1 | 11/2018 | Hall et al. |
| 2019/0010977 A1* | 1/2019 | Shigihara ............... F04D 29/057 |
| 2019/0063495 A1 | 2/2019 | Peterson et al. |
| 2019/0136628 A1 | 5/2019 | Savage et al. |
| 2019/0170186 A1 | 6/2019 | Gonzalez et al. |
| 2020/0031586 A1 | 1/2020 | Miess et al. |
| 2020/0032846 A1 | 1/2020 | Miess et al. |
| 2020/0056659 A1* | 2/2020 | Prevost ............... F16C 33/043 |
| 2020/0063498 A1 | 2/2020 | Prevost et al. |
| 2020/0182290 A1 | 6/2020 | Doehring et al. |
| 2020/0325933 A1 | 10/2020 | Prevost et al. |
| 2020/0362956 A1 | 11/2020 | Prevost et al. |
| 2020/0378440 A1 | 12/2020 | Prevost et al. |
| 2021/0140277 A1 | 5/2021 | Hall et al. |
| 2021/0148406 A1* | 5/2021 | Hoyle ............... F16C 33/26 |
| 2021/0198949 A1 | 7/2021 | Haugvaldstad et al. |
| 2021/0207437 A1 | 7/2021 | Raymond |
| 2021/0222734 A1 | 7/2021 | Gonzalez et al. |

FOREIGN PATENT DOCUMENTS

| | | |
|---|---|---|
| CN | 102128214 B | 12/2012 |
| CN | 103069099 A | 8/2016 |
| CN | 109072811 A | 12/2018 |
| CN | 106678189 A | 11/2023 |
| DE | 4226986 A1 | 2/1994 |
| DE | 29705983 U1 | 6/1997 |
| DE | 102010052804 A1 | 5/2012 |
| EP | 0595630 B1 | 1/1998 |
| EP | 1931852 B1 | 1/2018 |
| GB | 2514445 B | 6/2015 |
| JP | S401624 U | 1/1965 |
| JP | S6061404 A | 4/1985 |
| JP | H06241232 A | 8/1994 |
| JP | 2000002315 A | 1/2000 |
| JP | 2000211717 A | 8/2000 |
| JP | 2002070507 A | 3/2002 |
| JP | 2004002912 A | 1/2004 |
| JP | 2006275286 A | 10/2006 |
| JP | 2007153141 A | 6/2007 |
| JP | 2007155041 A | 6/2007 |
| JP | 2008056735 A | 3/2008 |
| JP | 2010174902 A | 8/2010 |
| JP | 2018141197 A | 9/2018 |
| WO | 8700080 A1 | 1/1987 |
| WO | 2004001238 A2 | 12/2003 |
| WO | 2006011028 A1 | 2/2006 |
| WO | 2008133197 A1 | 11/2008 |
| WO | 2011052231 A1 | 5/2011 |
| WO | 2013043917 A1 | 3/2013 |
| WO | 2014014673 A1 | 1/2014 |
| WO | 2014189763 A1 | 11/2014 |
| WO | 2016089680 A1 | 6/2016 |
| WO | 2017034787 A1 | 3/2017 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |
| WO | 2020028188 A1 | 2/2020 |

OTHER PUBLICATIONS

Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.

Element six, The Element Six CVD Diamond Handbook, Accessed on Nov. 1, 2019, 28 pages.

Grossman, David, What the World Needs Now is Superhard Carbon, Popular Mechanics, https://www.popularmechanics.com/science/environment/a28970718/superhard-materials/, Sep. 10, 2019, 7 pages, Hearst Magazine Media, Inc.

International Search Report and Written Opinion dated Mar. 16, 2022 (received in PCT Application No. PCT/US21/058587).

Liao, Y.; Marks, L.; In situ single asperity wear at the nanometre scale, International Materials Reviews, 2016, pp. 1-17, Taylor & Francis.

Linear Rolling Bearings ME EN 7960—Precision Machine Design Topic 8, Presentation, Accessed on Jan. 26, 2020, 23 Pages, University of Utah.

Machinery's Handbook 30th Edition, Copyright Page and Coefficients of Friction Page, 2016, p. 158 (2 Pages total), Industrial Press, Inc., South Norwalk, U.S.A.

Machinery's Handbook, 2016, Industrial Press, Inc., 30th edition, pp. 843 and 1055 (6 pages total).

(56) References Cited

OTHER PUBLICATIONS

Mccarthy, J. Michael; Cam and Follower Systems, PowerPoint Presentation, Jul. 25, 2009, pp. 1-14, UCIrvine The Henry Samueli School of Engineering.

McGill Cam Follower Bearings brochure, 2005, p. 1-19, Back Page, Brochure MCCF-05, Form #8991 (20 Pages total).

Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.

Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).

RBC Aerospace Bearings Rolling Element Bearings catalog, 2008, Cover Page, First Page, pp. 1-149, Back Page (152 Pages total).

RGPBalls Ball Transfer Units catalog, accessed on Jun. 23, 2018, pp. 1-26, 2 Back Pages (28 Pages total).

Sandvik Coromant Hard part turning with CBN catalog, 2012, pp. 1-42, 2 Back Pages (44 Pages total).

Sexton, Timothy N.; Cooley, Craig H.; Diamond Bearing Technology for Deep and Geothermal Drilling, PowerPoint Presentation, 2010, 16 Pages.

SKF Ball transfer units catalog, Dec. 2006, Cover Page, Table of Contents, pp. 1-36, 2 Back Pages (40 Pages total), Publication 940-711.

Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).

Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.

Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.

Surface Finish, Wikipedia, https://en.wikipedia.org/wiki/Surface_finish, Retrieved from https://en.wikipedia.org/w/index.php?title=Surface_finish&oldid=919232937, Oct. 2, 2019, 3 pages.

United States Defensive Publication No. T102,901, published Apr. 5, 1983, in U.S. Appl. No. 298,271 [2 Pages].

USSynthetic Bearings and Waukesha Bearings brochure for Diamond Tilting Pad Thrust Bearings, 2015, 2 Pages.

USSynthetic Bearings brochure, accessed on Jun. 23, 2018, 12 Pages, Orem, Utah.

Zeidan, Fouad Y.; Paquette, Donald J., Application of High Speed and High Performance Fluid Film Bearings in Rotating Machinery, 1994, pp. 209-234.

Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.

Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.

Anonymous: "Chemical vapor deposition—Wikipedia", Dec. 27, 2023, Retrieved from the Internet on Feb. 9, 2024, https://en.wikipedia.org/wiki/Chemical_vapor_deposition#Diamond (14 pages).

Anonymous: "CVD Diamond—FAQ", Feb. 8, 2024, Retrieved from the Internet on Feb. 9, 2024, http://www.cvd-diamond.com/faq_en.htm (4 pages).

Anonymous: "Diamond-like carbon—Wikipedia", Jan. 9, 2024, Retrieved from the Internet on Feb. 9, 2024, https://en.wikipedia.org/wiki/Diamond-like_carbon (10 pages).

* cited by examiner

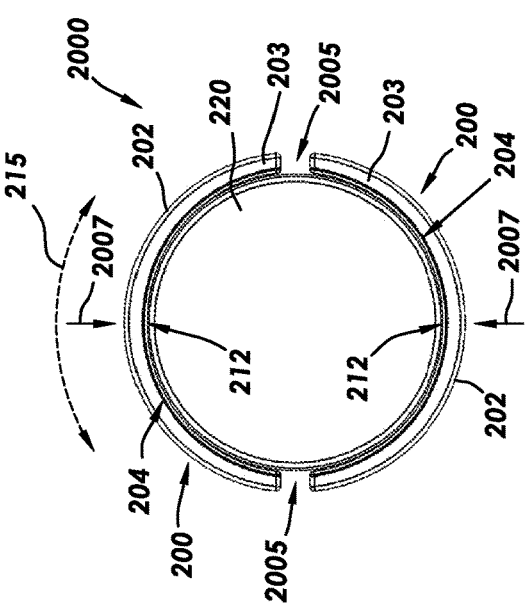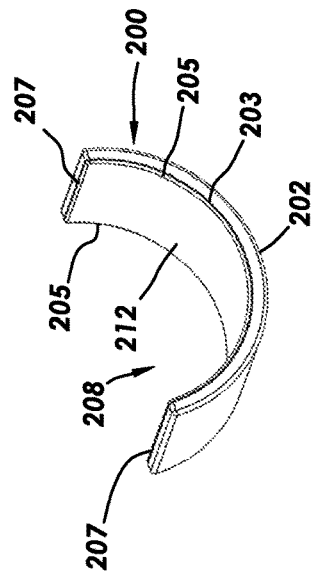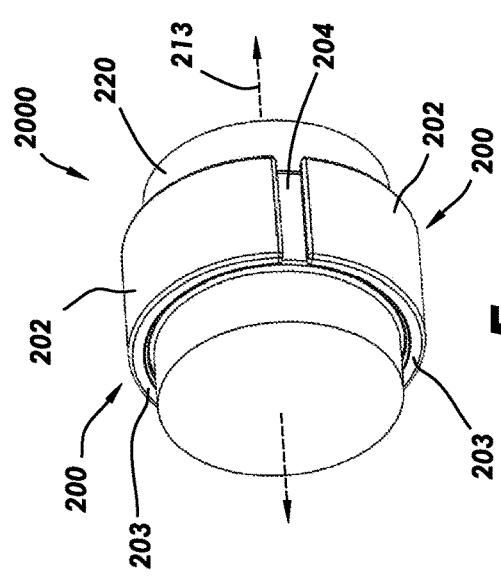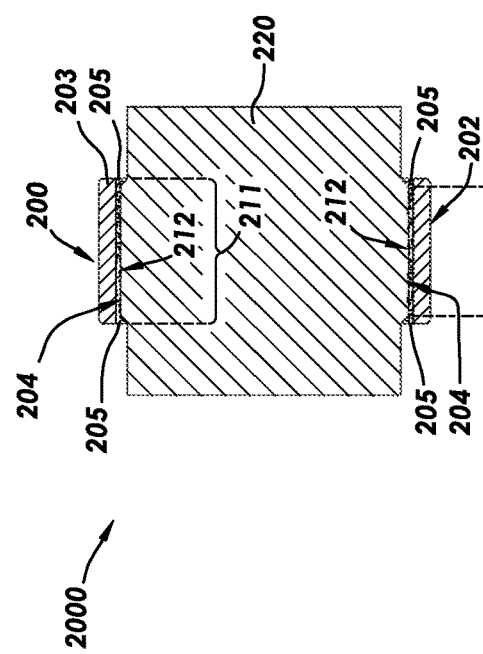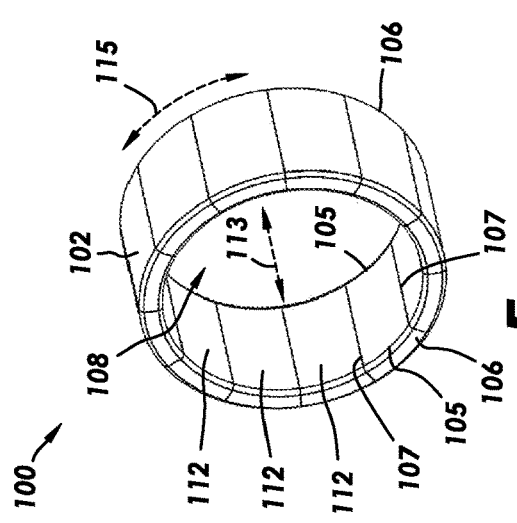

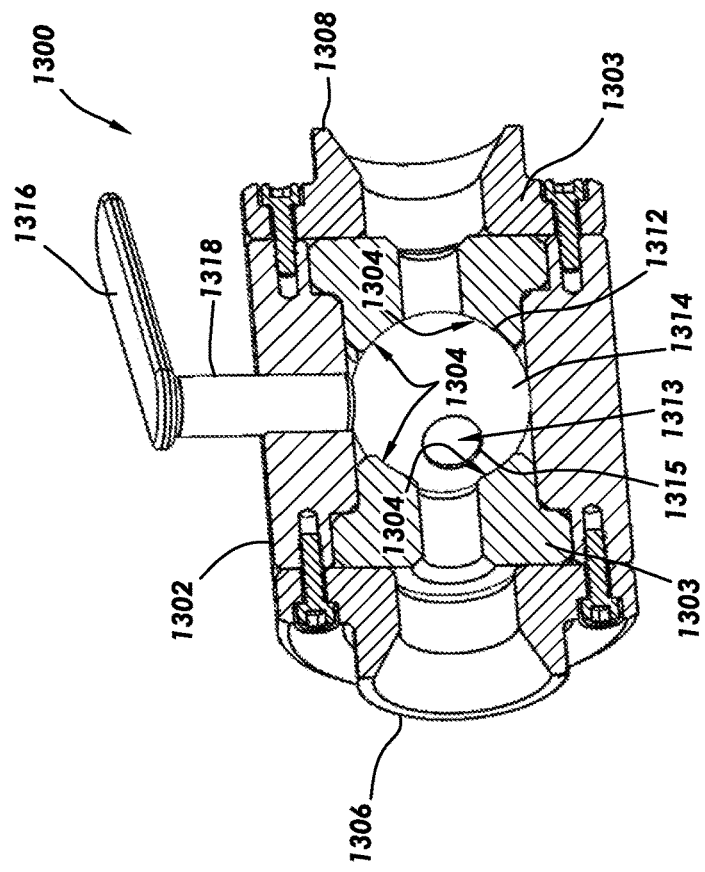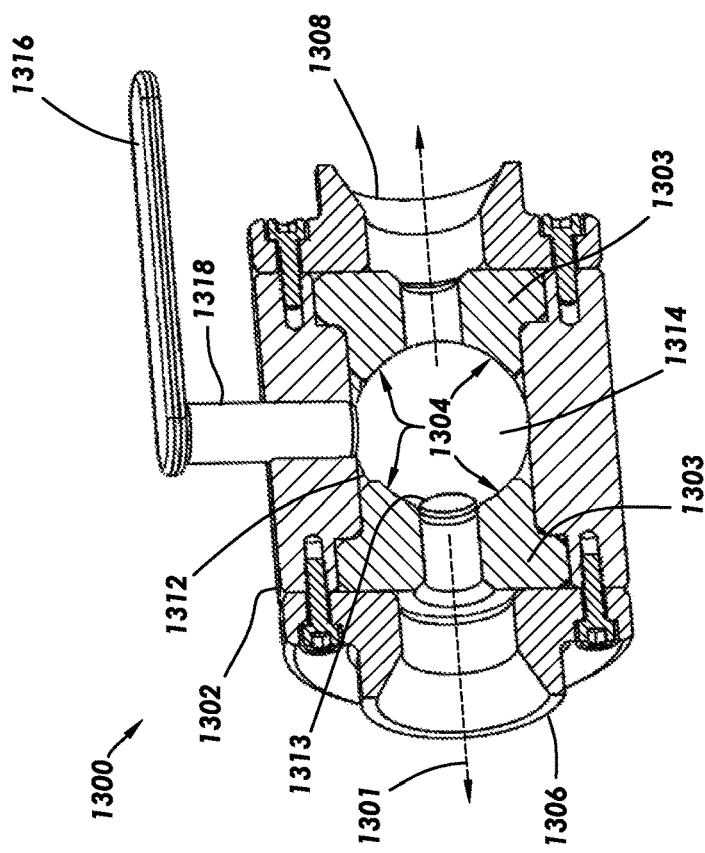

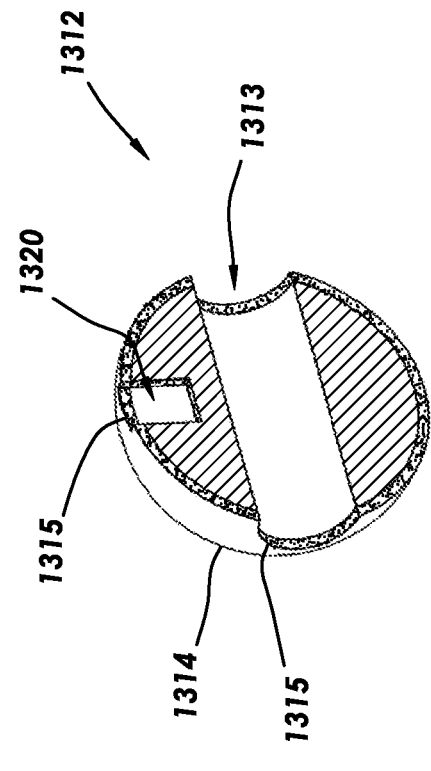
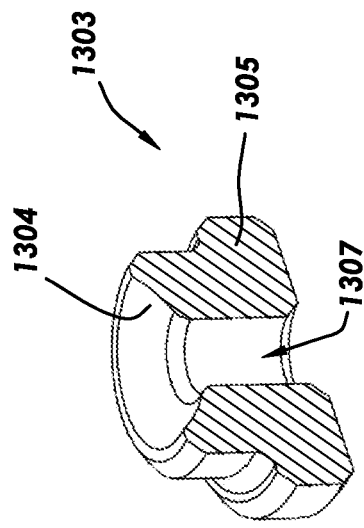
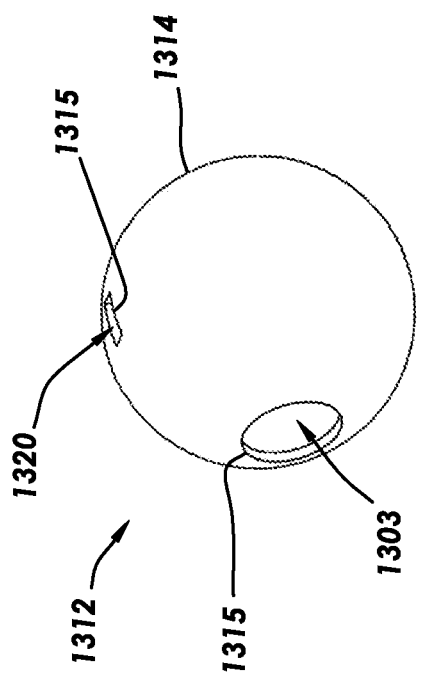
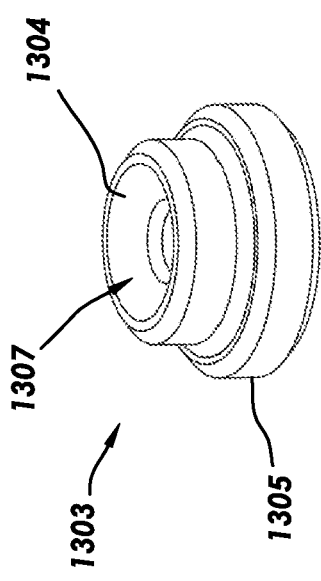
FIG.4A
FIG.4B
FIG.4C
FIG.4D

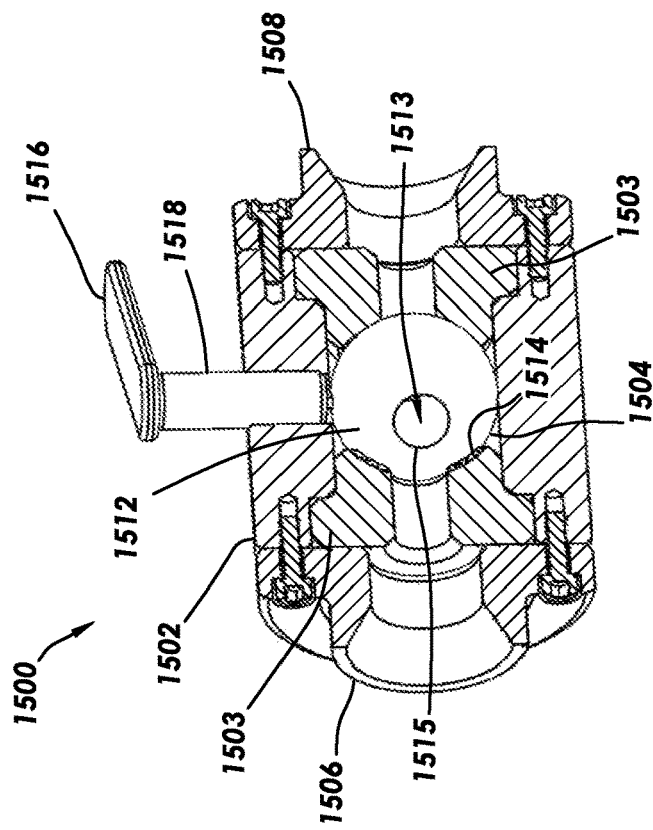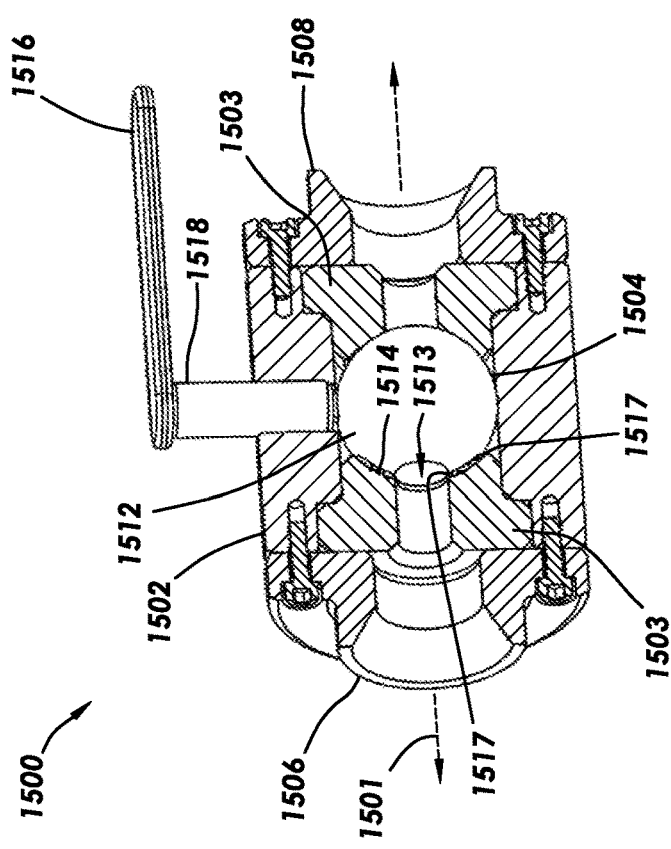
FIG.5B
FIG.5A

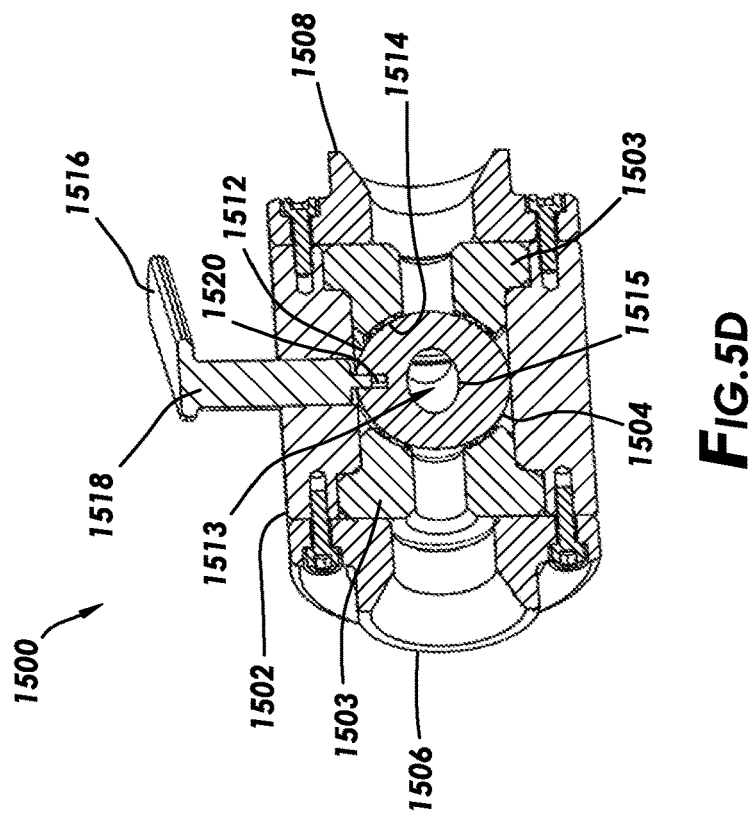
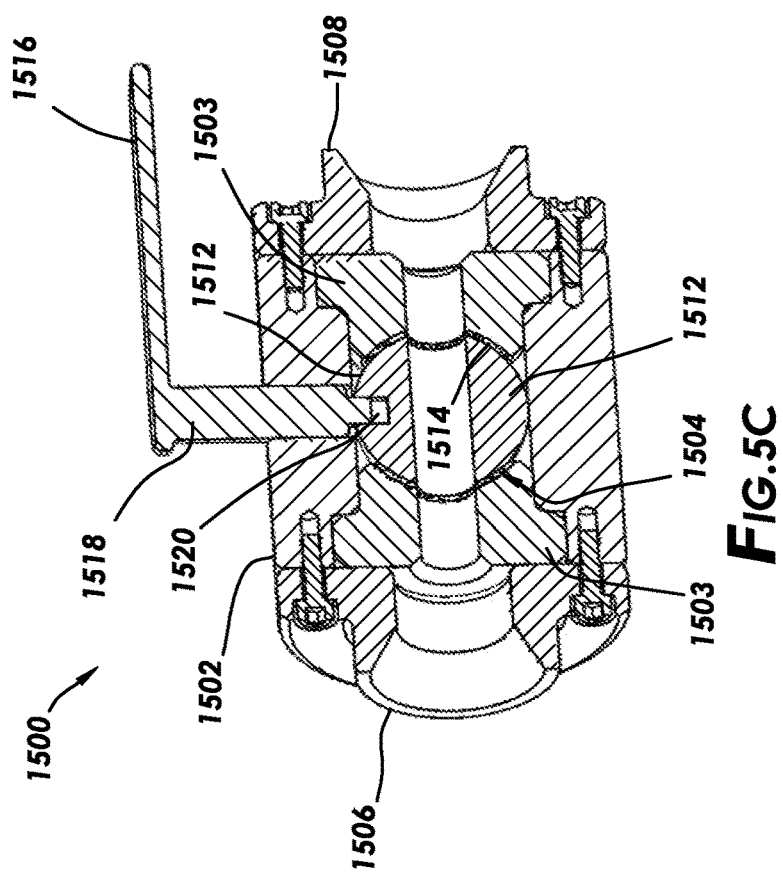

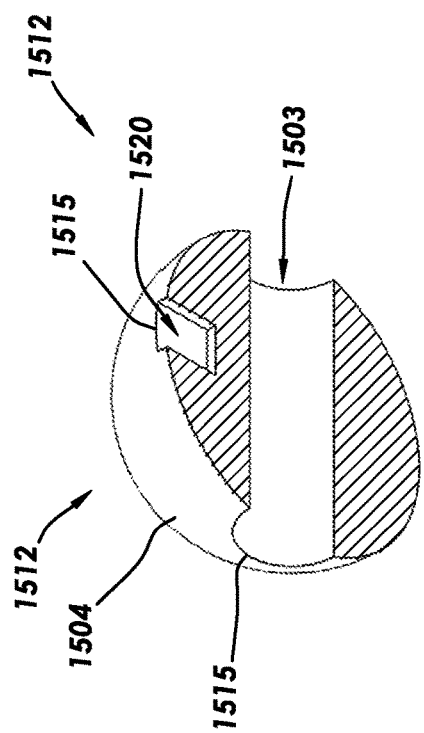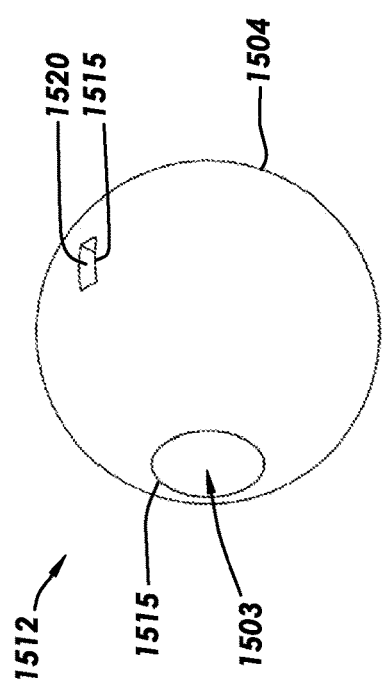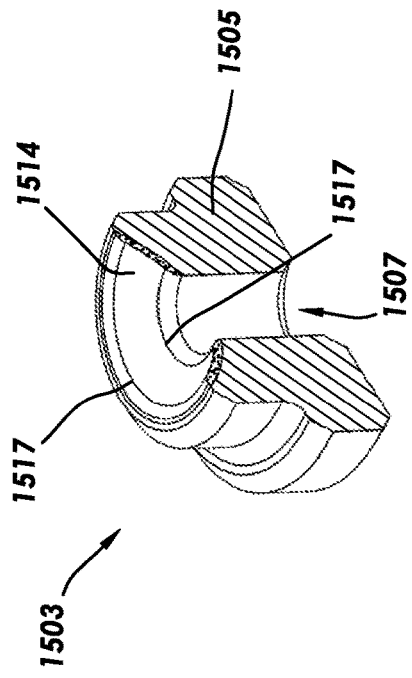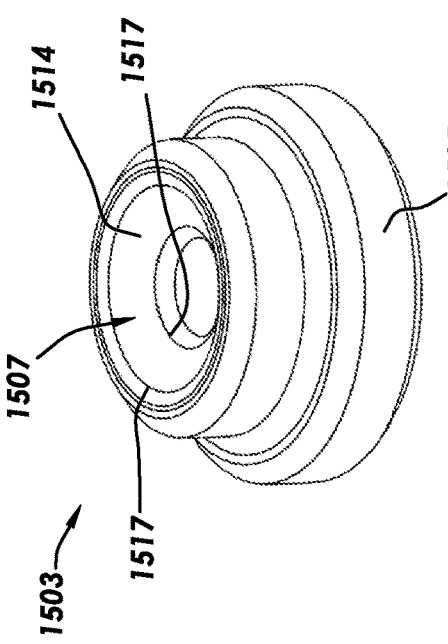

DIAMOND SURFACE BEARINGS FOR SLIDING ENGAGEMENT WITH METAL SURFACES

CROSS-REFERENCE TO RELATED APPLICATIONS

The present application claims the benefit of U.S. Provisional Patent Application No. 63/111,147, filed on Nov. 9, 2020, and entitled "Diamond Surface Bearings for Sliding Engagement with Metal Surfaces," the entirety of which is incorporated herein by reference.

FIELD

The present disclosure relates to bearings that include diamond bearing surfaces engaged with metal bearing surfaces, to apparatus and systems including the same, and to methods of making and using the same.

BACKGROUND

Bearings are employed in myriad applications including, but not limited to, aircraft, aerospace, transportation, defense, agriculture, mining, construction, and energy (e.g., oil and gas drilling and production tools). Bearings can have many different configurations, such as radial bearings, axial bearings (e.g., thrust bearings), combination radial and axial bearings, linear bearings, and power transmission surface bearings.

When diamond elements are used in moving parts, typically both the engagement surface and the opposing engagement surface of the bearing assembly is composed of polycrystalline diamond. This is, at least in part, because thermally stable polycrystalline diamond (TSP), either supported or unsupported by tungsten carbide, and polycrystalline diamond compact (PDC) have been considered as contraindicated for use in the machining of diamond reactive materials. At certain surface speeds in moving parts, load and attendant temperature generated, such as at a cutting tip, often exceeds the graphitization temperature of diamond (i.e., about 700° C.), which can, in the presence of a diamond reactive material, lead to rapid wear and failure of components. Without being bound by theory, the specific failure mechanism is believed to result from the chemical interaction of the carbon bearing diamond with the carbon attracting material that is being machined. An exemplary reference concerning the contraindication of diamond for diamond reactive material machining is U.S. Pat. No. 3,745,623. The contraindication of diamond for machining diamond reactive material has long caused the avoidance of the use of diamond in all contacting applications with such materials.

BRIEF SUMMARY

Some embodiments of the present disclosure include a split radial journal bearing assembly. The split radial journal bearing assembly includes a first radial journal bearing and a second radial journal bearing, each having a bearing body and a radial bearing surface thereon. The assembly includes a part having a body and an opposing bearing surface thereon. The part is positioned between the first and second radial journal bearings, and the first and second radial journal bearings are spaced apart such that at least one gap is between the first and second radial journal bearings. One of the radial bearing surfaces or the opposing bearing surface includes polycrystalline diamond having a surface finish of 20 µin Ra or less. The other of the radial bearing surfaces and the opposing bearing surface includes a metal that contains at least 2 weight percent of a diamond solvent-catalyst based on a total weight of the metal. The metal is engaged with the polycrystalline diamond.

Some embodiments of the present disclosure include a split radial journal bearing assembly. The split radial journal bearing assembly includes a first radial journal bearing and a second radial journal bearing, each having a bearing body and a radial bearing surface thereon. The assembly includes a part having a body and an opposing bearing surface thereon. The part is positioned between the first and second radial journal bearings, and the first and second radial journal bearings are spaced apart such that at least one gap is between the first and second radial journal bearings. One of the radial bearing surfaces or the opposing bearing surface includes polycrystalline diamond having a surface finish of 20 µin Ra or less. The other of the radial bearing surfaces and the opposing bearing surface includes a metal that contains at least 2 weight percent of iron, cobalt, nickel, titanium, copper, ruthenium, rhodium, palladium, chromium, manganese, or tantalum based on a total weight of the metal. The metal is engaged with the polycrystalline diamond.

Some embodiments of the present disclosure include a method of providing a bearing on a part. The method includes positioning a first radial journal bearing and a second radial journal bearing relative to a part, such that the part is positioned between the first and second radial journal bearings. The first and second radial journal bearings are spaced apart such that at least one gap is between the first and second radial journal bearings. One of the radial bearing surfaces or the opposing bearing surface includes polycrystalline diamond, and the other of the radial bearing surfaces and the opposing bearing surface includes a metal that contains at least 2 weight percent of a diamond solvent-catalyst based on a total weight of the metal. The method includes lapping and/or polishing the polycrystalline diamond bearing surfaces such that the polycrystalline diamond bearing surfaces have a surface finish of 20 µin Ra or less. The method includes engaging the metal with the polycrystalline diamond, and moving the part and the radial journal bearings relative to one another such that the metal slides along the polycrystalline diamond.

Some embodiments of the present disclosure include a bearing assembly having a bearing with a bearing body and a part with a part body. One of the bearing body and the part body has a metal bearing surface thereon, and the other of the bearing body and the part body has a plurality of polycrystalline diamond bearing elements thereon. Each polycrystalline diamond bearing element has a surface finish of 20 µin Ra or less. The metal bearing surface includes a metal that contains at least 2 weight percent of a diamond solvent-catalyst based on a total weight of the metal. The polycrystalline diamond bearing elements are arranged contiguously such that adjacent polycrystalline diamond bearing elements are in contact at boundary edges of the adjacent polycrystalline diamond bearing elements, and such that surfaces of the adjacent polycrystalline diamond bearing elements are flush at the boundary edges. The metal bearing surface is engaged with surfaces of the plurality of polycrystalline diamond bearing elements.

Some embodiments of the present disclosure include a bearing assembly having a bearing with a bearing body and a part with a part body. One of the bearing body and the part body has a metal bearing surface thereon, and the other of the bearing body and the part body has a plurality of polycrystalline diamond bearing elements thereon. Each polycrystalline diamond bearing element has a surface finish of 20 μin Ra or less. The metal bearing surface includes a metal that contains at least 2 weight percent of iron, cobalt, nickel, titanium, copper, ruthenium, rhodium, palladium, chromium, manganese, or tantalum based on a total weight of the metal. The polycrystalline diamond bearing elements are arranged contiguously such that adjacent polycrystalline diamond bearing elements are in contact at boundary edges of the adjacent polycrystalline diamond bearing elements, and such that surfaces of the adjacent polycrystalline diamond bearing elements are flush at the boundary edges. The metal bearing surface is engaged with surfaces of the plurality of polycrystalline diamond bearing elements.

Some embodiments of the present disclosure include a method of providing a bearing on a part. The method includes providing a bearing having a bearing body and a part having a part body. One of the bearing body and the part body has a metal bearing surface thereon, and the other of the bearing body and the part body has a plurality of polycrystalline diamond bearing elements thereon. The metal bearing surface includes a metal that contains at least 2 weight percent of a diamond solvent-catalyst based on a total weight of the metal. The method includes lapping and/or polishing each polycrystalline diamond bearing element such that each polycrystalline diamond bearing element has a surface finish of 20 μin Ra or less. The polycrystalline diamond bearing elements are arranged contiguously such that adjacent polycrystalline diamond bearing elements are in contact at boundary edges of the adjacent polycrystalline diamond bearing elements, and such that surfaces of the adjacent polycrystalline diamond bearing elements are flush at the boundary edges. The method includes coupling the bearing and the part such that the metal bearing surface is engaged with the plurality of polycrystalline diamond bearing elements, and moving the part and the bearing relative to one another such that the metal bearing surface slides along the polycrystalline diamond bearing elements.

Some embodiments of the present disclosure include a valve. The valve includes a valve member having a valve member body and a first engagement surface on the valve member body. The valve includes a valve seat having a valve seat body and a second engagement surface on the valve seat body. One of the first and second engagement surfaces is a polycrystalline diamond engagement surface, and the other of the first and second engagement surfaces is a metal engagement surface including a metal that contains at least 2 weight percent of a diamond solvent-catalyst based on a total weight of the metal. The valve member is coupled with the valve seat and movable relative to the valve seat between an open position and a closed position, such that the metal engagement surface is slidingly engaged with the polycrystalline diamond engagement surface.

Some embodiments of the present disclosure include a valve. The valve includes a valve member having a valve member body and a first engagement surface on the valve member body. The valve includes a valve seat having a valve seat body and a second engagement surface on the valve seat body. One of the first and second engagement surfaces is a polycrystalline diamond engagement surface, and the other of the first and second engagement surfaces is a metal engagement surface including a metal that contains at least 2 weight percent of iron, cobalt, nickel, titanium, copper, ruthenium, rhodium, palladium, chromium, manganese, or tantalum based on a total weight of the metal. The valve member is coupled with the valve seat and movable relative to the valve seat between an open position and a closed position, such that the metal engagement surface is slidingly engaged with the polycrystalline diamond engagement surface.

Some embodiments of the present disclosure include a method of providing and using a valve. The method includes providing a valve member and a valve seat. The method includes providing one of the valve member and the valve seat with a polycrystalline diamond engagement surface, and providing the other of the valve member and the valve seat with a metal engagement surface. The metal engagement surface includes a metal that contains at least 2 weight percent of a diamond solvent-catalyst based on a total weight of the metal. The method includes lapping and/or polishing the polycrystalline diamond engagement surface such that the polycrystalline diamond engagement surface has a surface finish of 20 μin Ra or less. The method includes coupling the valve member with the valve seat such that the metal engagement surface is engaged with the polycrystalline diamond engagement surface. The method includes regulating flow of a fluid through the valve by opening the valve, closing the valve, or combinations thereof. Opening and closing the valve includes moving the valve member relative to the valve seat. Moving the valve member relative to the valve seat includes sliding the metal engagement surface along the polycrystalline diamond engagement surface.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1 is a perspective view of a journal bearing having multiple, segmented bearing surfaces that extend longitudinally (axially) along an interior surface of the journal bearing.

FIG. 2A is a perspective view of a bearing assembly including a split radial journal bearing engaged with a shaft.

FIG. 2B is an end view of the bearing assembly of FIG. 2A.

FIG. 2C is a cross sectional view of the bearing assembly of FIG. 2A.

FIG. 2D is a view of one of the radial journal bearings of FIG. 2A in isolation from the remainder of the bearing assembly.

FIG. 3A depicts a ball valve in an open position, with the valve body in cross-section and including a ball having a polycrystalline diamond engagement surface.

FIG. 3B is the ball valve of FIG. 3A in a closed position.

FIG. 4A depicts the ball of FIG. 3A in isolation from the remainder of the ball valve.

FIG. 4B depicts the ball of FIG. 4A in cross-section.

FIG. 4C depicts a cup of the ball valve of FIG. 3A in isolation from the remainder of the ball valve.

FIG. 4D depicts the cup of FIG. 4C in cross-section.

FIG. 5A depicts a ball valve in an open position, with the valve body in cross-section and including a cup having a polycrystalline diamond engagement surface.

FIG. 5B is the ball valve of FIG. 5A in a closed position.

FIG. 5C depicts the ball valve of FIG. 5A, with the ball in cross-section.

FIG. 5D depicts the ball valve of FIG. 5B, with the ball in cross-section.

FIG. 6A depicts the ball of FIG. 5A in isolation from the remainder of the ball valve.

FIG. 6B depicts the ball of FIG. 6A in cross-section.

FIG. 6C depicts a cup of the ball valve of FIG. 5A in isolation from the remainder of the ball valve.

FIG. 6D depicts the cup of FIG. 6C in cross-section.

DETAILED DESCRIPTION

Figure 3D:
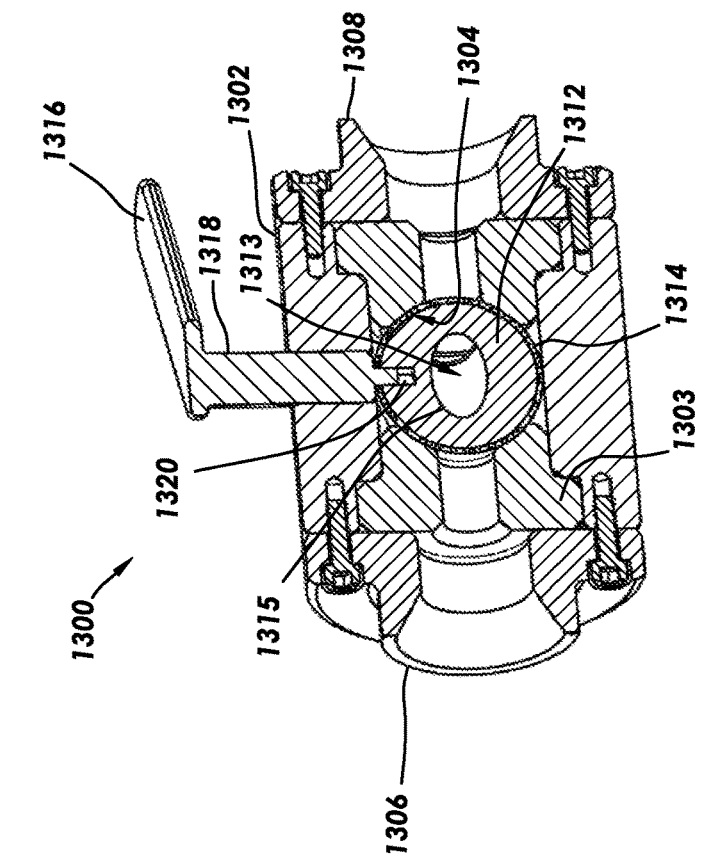
FIG. 3D depicts the ball valve of FIG. 3B, with the ball in cross-section.

Certain embodiments of the present disclosure include bearings that include polycrystalline diamond bearing surfaces engaged with metal bearing surfaces, to apparatus and systems including the same, and to methods of making and using the same.

Diamond Bearing Surfaces

The bearing assemblies disclosed herein include a polycrystalline diamond engagement surface (also referred to as a polycrystalline diamond bearing surface) engaged with an opposing engagement surface (also referred to as an opposing bearing surface). The polycrystalline diamond may be or include thermally stable polycrystalline diamond, either supported or unsupported by a support, such as a tungsten carbide support. The polycrystalline diamond may be or include a polycrystalline diamond compact (PDC). In certain applications, the polycrystalline diamond disclosed herein has increased cobalt content transitions layers between an outer polycrystalline diamond surface and a supporting tungsten carbide slug. The polycrystalline diamond may be non-leached, leached, leached and backfilled, thermally stable, or coated with a material via chemical vapor deposition (CVD). In some embodiments, the polycrystalline diamond is formed via a CVD process. Throughout the descriptions of the embodiments in this disclosure, for the sake of brevity and simplicity, "diamond" is used to refer to "polycrystalline diamond." That is, the "diamond bearing surfaces" disclosed herein are "polycrystalline diamond bearing surfaces" and the "diamond bearing elements" are "polycrystalline diamond bearing elements."

In certain applications, the diamond, or at least the engagement surface thereof, is lapped or polished, optionally highly lapped or highly polished. Although highly polished diamond is used in at least some applications, the scope of this disclosure is not limited to highly polished diamond and includes diamond that is highly lapped or polished. As used herein, a surface is defined as "highly lapped" if the surface has a surface roughness of 20 μin Ra or less than about 20 μin Ra, such as a surface roughness ranging from about 18 to about 22 μin Ra. As used herein, a surface is defined as "polished" if the surface has a surface roughness of between 2 to about 10 μm. As used herein, a surface is defined as "highly polished" if the surface has a surface roughness of less than 2 μin Ra. Typical "highly polished" surfaces have a surface roughness of from about 0.5 μm to less than about 2 μin.

In some aspects, the diamond bearing surfaces disclosed herein have a surface roughness ranging from 0.5 μin Ra to 20 μin Ra, or from 2 μin Ra to 18 μin Ra, or from 5 μm Ra to 15 μin Ra, or from 8 μin Ra to 12 μin Ra, or less than 20 μin Ra, or less than 18 μin Ra, or less than 10 μin Ra, or less than 2 μin Ra, or any range or value therebetween. Without being bound by theory, it is believed that diamond that has been polished to a surface roughness of 0.5 μm has a coefficient of friction that is less than (e.g., about half or more than half) of standard lapped diamond that has a surface roughness of 20-40 μm. U.S. Pat. Nos. 5,447,208 and 5,653,300 to Lund et al. provide disclosure relevant to polishing of diamond. As would be understood by one skilled in the art, surface finish, also referred to as surface texture or surface topography, is a characteristic of a surface as defined by lay, surface roughness, and waviness. Surface finish may be determined in accordance with ASME B46.1-2009. Surface finish or roughness may be measured with a profilometer, laser microscope, or with Atomic Force Microscopy, for example.

Opposing Bearing Surface

In some embodiments, the opposing bearing surface includes a diamond reactive material. As used herein, a "diamond reactive material" is a material that contains more than trace amounts of diamond solvent-catalyst (also referred to as a diamond catalyst-solvent). As used herein, a material that contains more than "trace amounts" of diamond solvent-catalyst is a material that contains at least 2 percent by weight (wt. %) diamond solvent-catalyst based on a total weight of the material. Some examples of known diamond solvent-catalysts are disclosed in: U.S. Pat. Nos. 6,655,845; 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; and 8,764,295. As would be understood by one skilled in the art, diamond solvent-catalysts are chemical elements, compounds, or materials (e.g., metals) that are capable of catalyzing the formation of diamond, such as by promoting intercrystallite diamond-to-diamond bonding between diamond grains to form a polycrystalline diamond. As would be understood by one skilled in the art, diamond solvent-catalysts are chemical elements, compounds, or materials (e.g., metals) that are capable of solubilizing polycrystalline diamond by catalyzing the reaction of the diamond into graphite, such as under load and at a temperature at or exceeding the graphitization temperature of diamond. Diamond solvent-catalysts are capable of catalyzing the graphitization of diamond (e.g., polycrystalline diamond), such as when under load and at a temperature at or exceeding the graphitization temperature of the diamond (i.e., about 700° C.). Diamond reactive materials include, but are not limited to, metals including metal alloys, and composite materials that contain more than trace amounts of diamond solvent-catalysts. Some exemplary diamond solvent-catalysts include iron, cobalt, nickel, ruthenium, rhodium, palladium, chromium, manganese, copper, titanium, and tantalum. Thus, a diamond reactive material can be a metal that includes more than trace amounts of iron, cobalt, nickel, ruthenium, rhodium, palladium, chromium, manganese, copper, titanium, and tantalum, or combinations thereof. One exemplary diamond reactive material is steel.

The diamond reactive material disclosed herein may be a metal or metal alloy (collectively referred to herein as a "metal" or a "metallic material") having a metal surface. As would be understood by one skilled in the art metals include materials that contain metal atoms that are typically characterized by metallic bonding between the metal atoms. That is, metals can be characterized as having metal atoms that are chemically bonded together, with at least predominantly metallic bonding between the metal atoms (e.g., in a crystalline structure of the metal atoms). The metals disclosed herein are not ceramics (e.g., carbides, oxides, nitrides, natural diamond), plastics, or composites (e.g., ceramic matrix composites or metal matrix composites, such as cermets, cemented carbide cobalt composites, PCD cobalt binder composites, CBN cobalt binder composites). In some embodiments the metal is a metal alloy. In other embodiments the metal is not a metal alloy (i.e., contains a single metal). The metal may be ferrous or a ferrous alloy. For example, the metal may be iron or an iron alloy, such as cast iron or steel, such as stainless steel, carbon steel, tool steel, or alloy steels. The metal may be non-ferrous or a non-ferrous alloy. For example, the metal may be nickel or a nickel alloy, cobalt or a cobalt alloy, copper or a copper alloy, titanium or a titanium alloy, ruthenium or a ruthenium alloy, rhodium or a rhodium alloy, palladium or a palladium alloy, chrome or a chrome alloy, manganese or a manganese alloy, or tantalum or a tantalum alloy.

In embodiments where the diamond reactive material is a metal, the opposing bearing surface is a metal surface. The opposing bearing surface may include a metal that contains at least 2 wt. % of a diamond solvent-catalyst based on a total weight of the metal. In some embodiments, the opposing bearing surface is or includes a metal that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal, or any range or value therebetween. In some embodiments, the opposing bearing surface is or includes a metal that contains at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the metal. In some embodiments, an entirety of the opposing bearing surface is a diamond reactive material.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of metal based on a total weight of the diamond reactive material, or any value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of metal based on a total weight of the diamond reactive material.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the diamond reactive material, or any value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the diamond reactive material.

In some embodiments, less than an entirety of the opposing bearing surface includes the diamond reactive material, with the provision that the metal contact area of the opposing bearing surface includes diamond reactive material in at least one position along the contact path between the metal contact area and the diamond contact area. For example, the opposing bearing surface may include a section of diamond reactive material adjacent a section of another material that is not a diamond reactive material.

In some embodiments, the diamond reactive material is a superalloy including, but not limited to, an iron-based superalloy, a cobalt-based superalloy, or a nickel-based superalloy.

In certain embodiments, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. Superhard materials are materials with a hardness value exceeding 40 gigapascals (GPa) when measured by the Vickers hardness test. The diamond reactive materials disclosed herein may be softer than a superhard material. For example, the diamond reactive materials disclosed herein may have a hardness value of less than 40 GPa, or less than 35 GPa, or less than 30 GPa, or less than 25 GPa, or less than 20 GPa, or less than 15 GPa, or less than 10 GPa, or less than 8 GPa, or less than 6 GPa, or less than 5 GPa, or less than 4 GPa, or less than 3 GPa, or less than 2 GPa, or less than 1 GPa when measured by the Vickers hardness test. The diamond reactive materials disclosed herein are softer than tungsten carbide (WC), which has a hardness of about 25 GPa. The diamond reactive materials disclosed herein include material that are softer than tungsten carbide tiles, cemented tungsten carbide, and infiltrated tungsten carbide. The diamond reactive materials disclosed herein include materials that are softer than silicon carbide, silicon nitride, cubic boron nitride, and polycrystalline diamond. One skilled in the art would understand that hardness may be determined by different tests, including a Brinell scale test in accordance with ASTM E10-18; the Vickers hardness test in accordance with ASTM E92-17; the Rockwell hardness test in accordance with ASTM E18; and the Knoop hardness test in accordance with ASTM E384-17.

In some embodiments, the diamond reactive materials are in the form of hardfacings, coatings, or platings on another material, such that the diamond reactive material forms the opposing bearing surface. In such embodiments, the hardfacing, coating, or plating includes the diamond reactive material. In some such embodiment, the material underlying the hardfacing, coating, or plating is not a diamond reactive material. In other such embodiments, the material underlying the hardfacing, coating, or plating is a diamond reactive material (the same or different than the overlying hardfacing, coating, or plating).

In some embodiments, the opposing bearing surface has carbon applied thereto. In some such embodiments, the carbon is applied to the opposing bearing surface prior to engagement with the diamond bearing surface. For example, the opposing bearing surface may be saturated with carbon. Without being bound by theory, it is believed that such application of carbon reduces the ability of the diamond solvent-catalyst in the opposing bearing surface to attract carbon through graphitization of the surface of the polycrystalline diamond element. That is, the carbon that is applied to the opposing bearing surface functions as a sacrificial layer of carbon. In such embodiments, the opposing bearing surface that underlies the carbon includes the diamond reactive material.

In some embodiments, the opposing bearing surface is a treated surface in accordance with U.S. patent application Ser. No. 16/425,758. For example, the opposing bearing surface (also referred to as the opposing engagement surface) may be hardened, such as via cold working and work hardening processes including burnishing and shot peening; and/or heat-treating processes including through hardening, case hardening, and subzero, cryogenic, deep-freezing treatments. Also, the opposing bearing surface may be plated and/or coated, such as via electroplating, electroless plating, including chromium plating, phosphating, vapor deposition, including physical vapor deposition (PVD) and chemical vapor deposition (CVD); or anodizing. Also, the opposing bearing surface may be cladded, such as via roll bonding, laser cladding, or explosive welding.

In some embodiments, the opposing bearing surface has a surface roughness of from 0.5 to 2,000 μin Ra, or from 1 to 1,900 μin Ra, or from 5 to 1,500 μin Ra, or from 10 to 1,200 μin Ra, or from 50 to 1,000 μin Ra, or from 100 to 800 μin Ra, or from 200 to 600 μin Ra. In some embodiments, the opposing bearing surface has a surface roughness that is equal to, less than, or greater than the diamond bearing surface.

Engaged Bearing Surfaces

In some embodiments, the present disclosure provides for interfacing contact between the diamond bearing surface and the opposing bearing surface within a bearing assembly. Interfacing contact between the bearing surfaces may include engaging the diamond bearing surface in sliding contact with the opposing bearing surface. As used herein, "engagement surface" or "bearing surface" refers to the surface of a material or component (e.g., the surface of polycrystalline diamond or the surface of a diamond reactive material) that is positioned and arranged within a bearing assembly such that, in operation of the bearing assembly, the "engagement surface" or "bearing surface" is positioned and/or available to interface the contact between two components to bear load (e.g., radial and/or axial load). In some embodiments, the diamond bearing surface disclosed herein is in direct contact with an opposing bearing surface without a fluid film therebetween (i.e., boundary lubrication). In other embodiments, a fluid film is positioned and/or develops between the diamond bearing surface and the opposing bearing surface such that the surfaces are not directly in contact with one another, but are engaged through the fluid film (i.e., hydrodynamic lubrication). The contact between the diamond bearing surface and opposing bearing surface may be between (or a mixture of) or may vary between direct contact and fluid film (i.e., mixed boundary lubrication).

Bearing Assemblies

In some embodiments, the diamond bearings disclosed herein are coupled with or otherwise incorporated into or with a bearing assembly. For example, the diamond bearings may be a portion of an axial bearing assembly, a radial bearing assembly, or a combined axial and radial bearing assembly. In some embodiments, the bearing assembly is a journal bearing or an angular contact bearing (e.g., a conical bearing or spherical bearing). The diamond bearings are not limited to being incorporated into the specific exemplary bearing assemblies shown herein. Some embodiments include a bearing assembly that includes one or more of the diamond bearing surfaces engaged with one or more of the opposing bearing surfaces. In some such embodiments, the diamond bearing surface is in sliding engagement with the opposing bearing surface. Depending on the desired configuration of the bearing assembly, the sliding engagement between the diamond bearing surface and the opposing bearing surface may be a flat surface interface, a curved (e.g., cylindrical) surface interface, or a combination of flat and curved surface interfaces.

In some embodiments, the coefficient of friction (CoF) exhibited by the engagement between the diamond bearing surfaces and the opposing bearing surfaces disclosed herein is less than 0.1, 0.09 or less, 0.08 or less, 0.07 or less, 0.06 or less, 0.05 or less, 0.04 or less, 0.03 or less, 0.02 or less, or 0.01 or less. In some embodiments, the CoF exhibited by the engagement between the diamond bearing surfaces and the opposing bearing surfaces disclosed herein ranges from 0.01 to 0.09, or 0.01 to 0.07, or 0.01 to 0.05, or 0.01 to 0.03, or any range or value therebetween.

Radial Journal Bearing

In some embodiments, the diamond bearing disclosed herein is a journal bearing (e.g., radial journal bearing) having a diamond bearing surface. With reference to FIG. 1, one embodiment of a journal bearing in accordance with the present disclosure is depicted. Journal bearing 100 has the form of a ring with an external surface 102, an internal surface, and sides 106 therebetween. The internal surface includes a plurality of segmented diamond bearing surfaces 112. While only three of the diamond bearing surfaces 112 are indicated with reference numerals, the plurality of diamond bearing surfaces are arranged to extend axially along the entirety of the internal circumference of journal bearing 100. Each diamond bearing surface has lateral boundary edges 105 and longitudinal boundary edges 107. As used herein, "boundary edges" of a surface are edges that are or define the perimeter of the surface. The lateral boundary edges 105 of each diamond bearing surface 112 extend parallel to one another about a portion of the circumference of the journal bearing 100, and the longitudinal boundary edges 107 of each diamond bearing surface 112 extend parallel to one another along the axial extent of the journal bearing 100. However, the diamond bearing surfaces disclosed herein are not limited to this particular shape and arrangement.

Each diamond bearing surface 112 is a separate surface from the adjacent diamond bearing surfaces. In some embodiments, each diamond bearing surface is a surface of a discrete diamond bearing element that is discrete from the adjacent diamond bearing elements, such that the adjacent diamond bearing elements and surfaces are not in contact. In some embodiments, the longitudinal boundary edge 107 between two adjacent diamond bearing surfaces is a groove formed into a single diamond bearing element, such that the diamond bearing surface of the single diamond bearing element is modified to have multiple segmented diamond bearing surfaces.

Journal bearing 100 has a cavity 108. In one exemplary application of the journal bearing 100, a shaft (not shown in FIG. 1) is coupled with journal bearing 100 such that the shaft is positioned within and extends through cavity 108. The shaft may be axially slidable within cavity 108 such that the exterior surface of the shaft is an opposing bearing surface that is slidingly engaged with the diamond bearing surfaces 112 and slides axially, in axial direction 113, along the diamond bearing surfaces 112. For example, such axial, sliding engagement between the shaft and the journal bearing 100 may be useful for a linear and/or reciprocating bearing assembly. During such axial sliding engagement between the shaft and the journal bearing 100, the opposing bearing surface of the shaft slides over, and in contact with, the lateral boundary edges 105 and longitudinal boundary edges 107 of the diamond bearing surfaces 112. The shaft may be rotatable within cavity 108 such that the exterior surface of the shaft is an opposing bearing surface that is slidingly engaged with the diamond bearing surfaces 112 and rotates (clockwise and/or counterclockwise) within cavity 108 along rotational line 115. During such rotation sliding engagement between the shaft and the journal bearing 100, the opposing bearing surface of the shaft would slide over, and in contact with, longitudinal boundary edges 107, and optionally the lateral boundary edges 105, of the diamond bearing surfaces 112. In some embodiments the shaft is both axially slidable and rotatable within cavity 108.

Split Bearing Assembly

With reference to FIGS. 2A-2D, bearing assembly 2000 is depicted. Bearing assembly 2000 includes a split bearing having two discrete bearing bodies, including two radial journal bearings 200. Each of radial journal bearings 200 has a body 203 with an outer surface 202 and an inner surface that is a diamond bearing surface 212. The boundary edges of each diamond bearing surface 212 is defined by lateral boundary edges 205 and longitudinal boundary edges 207. Radial journal bearings 200 have a curvature that defines concavity 208.

Bearing assembly 2000 includes shaft 220 slidingly engaged within and between the two concavities 208 of the two radial journal bearings 200. The outer surface of shaft is the opposing bearing surface 204 when assembled with the two radial journal bearings 200, such that opposing bearing surface 204 is slidingly engaged with diamond bearing surfaces 212. In the embodiment shown, opposing bearing surface 204 has a width 223 that is less than a lateral width 211 of diamond bearing surfaces 212, such that opposing bearing surface 204 is engaged with diamond bearing surfaces 212 entirely within the lateral boundary edges 205 of diamond bearing surfaces 212. In some embodiments, the surface area of the opposing bearing surface 204 is smaller than the surface area of the diamond bearing surfaces 212.

With the shaft 220 engaged with the two, discrete radial journal bearings 200, gaps 2005 are formed between the adjacent radial journal bearings 200, wherein the underlying opposing bearing surface 204 of the shaft 220 is exposed. That is, the two radial journal bearings 200 are separated from one another by a distance. In some applications, such a split or gap between the radial journal bearings 200 is useful, such as in applications where known directional loads 2007 are applied to the bearing assembly 2000. That is, where the direction of the load is known, there may be portions of the shaft 220 that do not require the presence of a bearing surface.

In some embodiments, an entirety of the surface area of opposing bearing surface 204 is engaged with less than an entirety of the surface area of each of the diamond bearing surfaces 212. The portion of a diamond bearing surfaces 212 that the opposing bearing surface 204 is engaged with during operation of bearing assembly 2000 is the "diamond contact area" of that diamond bearing surface 212.

In embodiments where shaft 220 rotates within radial journal bearings 200, the opposing bearing surface 204 slides along diamond bearing surfaces 212 and slides past longitudinal boundary edges 207, such that the opposing bearing surface 204 slides over, in contact with, and past boundary edges of the diamond bearing surfaces 212. That is, a particular portion of the surface of opposing bearing surface 204 rotates along rotational line 215 from engagement with one of diamond bearing surfaces 212, into one of gaps 2005, and then into engagement with the other of the diamond bearing surfaces 212. As the opposing bearing surface 204 moves into and out of gaps 2005, the opposing bearing surface 204 slides over the longitudinal boundary edges 207 of the diamond bearing surfaces 212.

In embodiments where shaft 220 moves axially relative to radial journal bearings 200, along axis 213, the opposing bearing surface 204 slides along diamond bearing surfaces 212 and slides past lateral boundary edges 205, such that the opposing bearing surface 204 slides over, in contact with, and past boundary edges of the diamond bearing surfaces 212.

In some embodiments, the shaft 220 moves both axially and rotationally relative to radial journal bearings 200, such that the opposing bearing surface 204 slides over both the lateral and longitudinal boundary edges, 205 and 207, of the diamond bearing surfaces 212.

While the split radial journal bearings of FIGS. 2A-2D are shown and described as having diamond bearing surfaces that are coupled with a shaft that has an opposing engagement surface of diamond reactive material, this arrangement can be reversed. For example, the shaft can have a diamond bearing surface and the split radial journal bearings can have an opposing engagement surface of diamond reactive material.

Bearing Surface

In embodiments disclosed herein, the opposing engagement surface(s) may be slidingly engaged with the diamond engagement surface(s) of the bearing assembly along a diamond contact area of the diamond engagement surface. As used herein, "diamond contact area" refers to the portion of the surface area of the diamond engagement surface that contacts the opposing engagement surface during operation of the bearing. That is, the diamond engagement surface is the surface area of the diamond bearing element that is available for contact as a bearing surface, and the diamond contact area is the portion of the surface area of the diamond engagement surface that contacts (directly or through a fluid film) the opposing engagement surface during operation of the bearing. In some embodiments, the diamond contact area has a surface area that is less than a surface area of the diamond engagement surface. That is, less than an entirety of the diamond engagement surface forms the diamond contact area of the diamond bearing. In some embodiments, such as in a radial bearing, the diamond contact area is a radial contact area. That is, the sliding movement of the opposing engagement surface along the diamond contact area on the diamond engagement surface is a radial, rotating movement along the diamond contact area. In other embodiments, the diamond contact area is an axial contact area. That is, the sliding movement of the opposing engagement surface on the diamond engagement surface is an axial movement along the diamond contact area. In some embodiments, the diamond contact area is both a radial and axial diamond contact area.

In some embodiments, the diamond bearings disclosed herein have discontinuous diamond bearing surfaces. For example, a bearing component (e.g., a radial journal bearing) having diamond bearing surfaces may be coupled with an opposing bearing component (e.g., a shaft) having an opposing bearing surface such that the opposing bearing is slidingly engaged with the diamond bearing surfaces along a diamond contact area of the diamond bearing surfaces, and such that the diamond bearing surfaces are "discontinuous" along the diamond contact area. As used herein, diamond bearing surfaces are "discontinuous surface" along a diamond contact area when the diamond bearing surfaces are interrupted by at least one boundary edge throughout the diamond contact area. That is, during operation, while the opposing bearing surface slides along the diamond contact area, the opposing bearing surface slides on, along, or in contact with at least one boundary edge of the diamond bearing surfaces. For example, with reference to FIG. 1, diamond bearing surfaces 112 are "discontinuous" along the circumferential extension of the diamond bearing surfaces 112 and are interrupted by boundary edges 107, and diamond bearing surfaces 112 are "discontinuous" along the axial extension of the diamond bearing surfaces 112 and are interrupted by the boundary edges 105.

While the diamond engagement surfaces disclosed herein include discontinuous diamond bearing surfaces, the diamond engagement surfaces may be treated, prepared, and/or arranged to reduce edge contact between the diamond engagement surfaces and the opposing engagement surfaces. In some embodiments, the boundary edges of the diamond bearing surfaces are beveled edges, radiused edges, or honed edges, such that the opposing bearing surface can slide over the boundary edges without (or with reduced) gouging as a result of edge contact with the boundary edges of the diamond. A performance criterion, in some embodiments, is that the diamond bearing elements are configured and positioned in such a way as to minimize or preclude edge contact with the opposing bearing surface. In some aspects, the diamond bearing elements are subjected to edge radius treatment to facilitate avoidance of edge contact with the opposing bearing surface. In some embodiments, the edge geometry of the diamond bearing element is subjected to a surface roughness reduction process, such as lapping and/or polishing. In other embodiments, the edge geometry of the polycrystalline diamond element is not subjected to a surface roughness reduction process. The diamond bearing surfaces disclosed herein may be planar, convex, or concave.

In some embodiments, adjacent diamond bearing elements are positioned relative to one another such that the diamond bearing elements are contiguous or nearly contiguous, and such that the adjacent diamond bearing surfaces thereof are flush or nearly flush with each other at the adjoining boundary edges thereof. For example, with reference to FIG. 1, adjacent diamond bearing surfaces 112 are positioned relative to one another such that the diamond bearing surfaces 112 are flush or nearly flush with each other at the boundary edges 107 therebetween. The provision of flush or nearly flush adjacent bearing surfaces, in combination with lapping and/or polishing of the diamond bearing surfaces, provides an array of multiple diamond bearing surfaces that, together, provide a contiguous or near contiguous bearing contact path for engagement with the metal bearing surface. The multiple diamond bearing surfaces are lapped and/or polished and arranged relative to one another such that the multiple diamond bearing surfaces, together, form a "substantially continuous surface." As used herein, multiple (or a plurality of) diamond bearing surfaces form a "substantially continuous surface" along the diamond contact areas of the diamond bearing surfaces when the diamond bearing surfaces are only interrupted by boundary edges throughout the diamond contact area where adjacent diamond bearing surfaces are flush or nearly flush. For example, during operation, while the opposing metal bearing surface slides along the diamond contact area, the opposing metal bearing surface slides on, along, and/or in contact only with boundary edges of the diamond bearing surfaces where the adjacent diamond bearing surfaces are flush or nearly flush. In some such embodiments, the adjacent diamond bearing elements are not spaced apart, and are in contact with one another, such that the bearing assembly includes an array of diamond bearing elements that are discrete but in contact with one another.

In some embodiments, edge treatment (e.g., radiused edges) of the boundary edges of the diamond bearing surfaces, in combination with lapping and/or polishing of the diamond bearing surfaces and relative positioning of the diamond bearing surfaces, may provide an array of multiple diamond bearing surfaces that, together, provide a bearing contact path for engagement with the metal bearing surface. For example, during operation, while the opposing metal bearing surface slides along the diamond contact area, the opposing metal bearing surface slides on, along, or in contact only with boundary edges of the diamond bearing surfaces that have been subjected to edge treatment (e.g., that are beveled, radiused, chamfered). For example, FIG. 2A depicts an embodiment where edge treatment of the diamond bearing surfaces 212 can provide for reduced contact of the metal bearing surface 204 with the diamond bearing surfaces 212.

Ball Valve

Figure 3C:
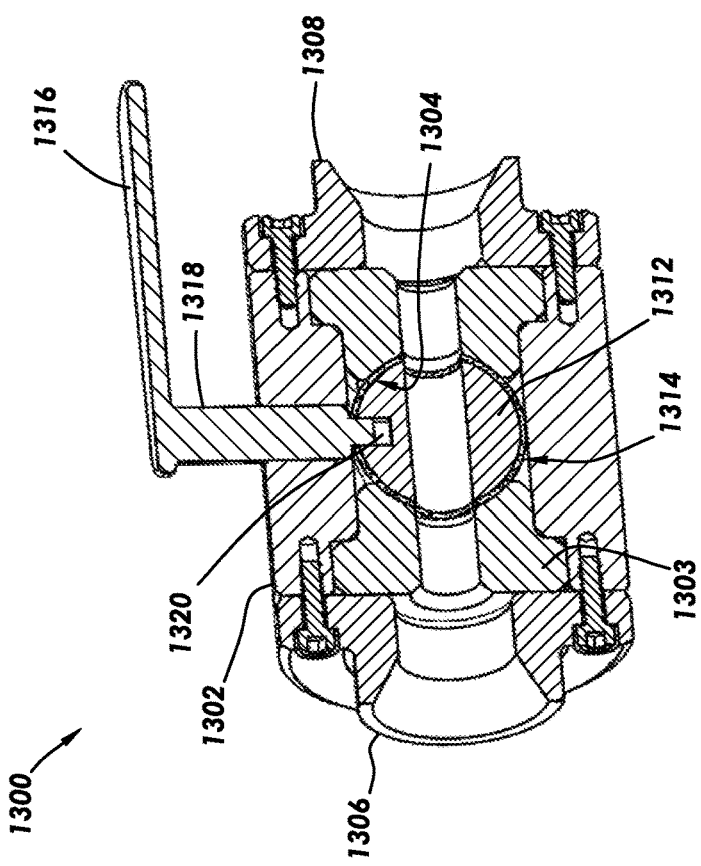
FIG. 3C depicts the ball valve of FIG. 3A, with the ball in cross-section.

Some embodiments of the present disclosure include a ball valve having a diamond engagement surface that is engaged with an opposing engagement surface. In some such embodiments, the ball valve includes a ball having the diamond engagement surface that is engaged within a cup having the opposing engagement surface. In other such embodiments, the ball valve includes a ball having an opposing engagement surface that is engaged within a cup having a diamond engagement surface. As the structure of ball valves are well known, the structure will only be briefly described herein. With reference to FIGS. 3A-3D, ball valve 1300 includes valve body 1302 and cups 1303 having opposing engagement surfaces 1304 thereon. The opposing engagement surfaces 1304 define a valve seat the ball valve 1300. The cups 1303 may be metal, and the opposing engagement surface(s) may be metal surfaces (e.g., steel surfaces). The opposing engagement surface(s) of the valves disclosed herein are surfaces of a diamond reactive material. The valve body 1302 includes inlet 1306, outlet 1308, and an internal cavity that defines a flow path 1301 through the ball valve 1300 from the inlet 1306 to the outlet 1308.

Ball valve includes ball 1312 having a diamond engagement surface 1314 thereon. In some embodiments, an entirety of the outer surface of ball 1312 is a diamond surface. Ball 1312 is positioned and slidingly engaged within the cavity of the valve body 1302 and positioned within the flow path 1301 such that the diamond engagement surface 1314 of ball 1312 is slidingly engaged with the opposing engagement surfaces 1304 of the cups 1303.

Ball 1312 includes hole 1313 defining a passageway or flow path 1301 through ball 1312. Ball valve 1300 includes valve handle 1316 coupled with stem 1318. Stem 1318 is coupled with ball 1312 at slot 1320, such that rotation of handle 1316 rotates stem 1318; thereby, rotating ball 1312. As shown in FIG. 3A, the ball 1312 is rotated such that hole 1313 is aligned with inlet 1306 and outlet 1308 to allow the passage of fluid through ball valve 1300. Thus, in FIG. 3A, ball valve 1300 is shown in the open configuration or open position. As shown in FIG. 3B, the ball 1312 is rotated such that hole 1313 is out of alignment with inlet 1306 and outlet 1308 to prevent the passage of fluid through ball valve 1300. Thus, in FIG. 3B, ball valve 1300 is shown in the closed configuration or closed position.

The diamond engagement surface 1314 is an outer surface of ball 1312, with the exception of hole 1313 which is an interruption (boundary edge) of the outer surface of ball 1312. When the ball 1312 is moved relative to the ball valve body 1302, such as from the open position to the closed position or vice versa, the diamond engagement surface 1314 slides along the opposing engagement surfaces 1304. In some embodiments, the boundary edge(s) 1315 that defines the hole 1313 slides over the opposing engagement surface(s) 1304, such that the diamond engagement surface 1314 is a "discontinuous surface." The boundary edge(s) 1315 of the hole 1313 may be subjected to edge treatment (e.g., radiused).

While the diamond engagement surface and opposing engagement surfaces are shown as incorporated into a ball valve, these features are not limited to use in a ball valve, and may be incorporated into other valves or other moving components where one surface is in sliding engagement with another surface, including applications where the surfaces are bearing load and/or are transmitting power.

FIGS. 4A and 4B depict the ball 1312 in isolation from the remainder of the ball valve 1300, and FIGS. 4C and 4D depict a cup 1303 in isolation from the remainder of the ball valve 1300.

Ball 1312 includes slot 1320. Slot 1320 is configured to receive stem 1318 (shown in FIGS. 3A-3D), such that stem 1318 engages within slot 1320 for coupling stem 1318 with ball 1312. Additional boundary edges 1315 of diamond engagement surface 1314 surround slot 1320.

Cup 1303 includes cup body 1305 with opposing bearing surface 1304 and cavity 1307. When assembled, as shown in FIGS. 3A-3D, cavity 1307 is aligned with inlet 1306 and outlet 1308.

With reference to FIGS. 5A-5D, ball valve 1500 is depicted. Ball valve 1500 is substantially the same as ball valve 1300 shown in FIGS. 3A-3D, with the exception that the position of the diamond and opposing engagement surfaces are switched.

Ball valve 1500 includes valve body 1502 and cups 1503 having diamond engagement surfaces 1514 thereon. The diamond engagement surfaces 1514 define a valve seat the ball valve 1500. The valve body 1502 includes inlet 1506, outlet 1508, and an internal cavity that defines a flow path 1501 through the ball valve 1500 from the inlet 1506 to the outlet 1508.

Ball valve includes ball 1512. The outer surface of ball 1512 is the opposing engagement surface 1504. In some embodiments, an entirety of the outer surface of ball 1512 is the opposing engagement surface. Ball 1512 is positioned and slidingly engaged within the cavity of the valve body 1502 and positioned within the flow path 1501 such that the diamond engagement surface(s) 1514 of cups 1503 is slidingly engaged with the opposing engagement surfaces 1504 of the ball 1512. The ball 1512 may be a metal ball, and the opposing engagement surface(s) may be a metal surface (e.g., a steel surface). The opposing engagement surface(s) of the valves disclosed herein are surfaces of a diamond reactive material.

Ball 1512 includes hole 1513 defining a passageway or flow path 1501 through ball 1512. Ball valve 1500 includes valve handle 1516 coupled with stem 1518. Stem 1518 is coupled with ball 1512 at slot 1520, such that rotation of handle 1516 rotates stem 1518; thereby, rotating ball 1512. As shown in FIG. 5A, the ball 1512 is rotated such that hole 1513 is aligned with inlet 1506 and outlet 1508 to allow the passage of fluid through ball valve 1500. Thus, in FIG. 5A, ball valve 1500 is shown in the open configuration or open position. As shown in FIG. 5B, the ball 1512 is rotated such that hole 1513 is out of alignment with inlet 1506 and outlet 1508 to prevent the passage of fluid through ball valve 1500. Thus, in FIG. 5B, ball valve 1500 is shown in the closed configuration or closed position.

The opposing engagement surface 1504 is an outer surface of ball 1512, with the exception of hole 1513 which is an interruption (boundary edge 1515) of the outer surface of ball 1512. The diamond engagement surfaces 1514 are surfaces of the cups 1503. The diamond engagement surfaces 1514 have boundary edges 1517. When the ball 1512 is moved relative to the valve body 1502, such as from the open position to the closed position or vice versa, the opposing engagement surface 1504 slides along the diamond engagement surfaces 1514. In some embodiments, the opposing engagement surface 1504 slides over the diamond engagement surfaces 1514, including over the boundary edges 1517 thereof, such that the diamond engagement surfaces 1514 are "discontinuous surfaces." The boundary edge(s) 1517 of the diamond on the cup 1503 may be subjected to edge treatment (e.g., radiused).

While the diamond engagement surface and opposing engagement surfaces are shown as incorporated into a ball valve, these features are not limited to use in a ball valve, and may be incorporated into other valves or other moving components where one surface is in sliding engagement with another surface, including applications where the surfaces are bearing load and/or are transmitting power.

FIGS. 6A and 6B depict the ball 1512 in isolation from the remainder of the ball valve 1500, and FIGS. 6C and 6D depict a cup 1503 in isolation from the remainder of the ball valve 1500.

Ball 1512 includes slot 1520. Slot 1520 is configured to receive stem 1518 (shown in FIGS. 5A-5D), such that stem 1518 engages within slot 1520 for coupling stem 1518 with ball 1512. Additional boundary edges 1515 of opposing engagement surface 1504 surround slot 1520.

Cup 1503 includes cup body 1505 having cavity 1507 therein. When assembled, as shown in FIGS. 5A-5D, cavity 1507 is aligned with inlet 1506 and outlet 1508. The diamond engaging surface 1514 includes boundary edges 1517. In some embodiments, cup body 1505 is a metal body (e.g., a steel body) with diamond engagement surface 1514 deposited thereon (e.g., via CVD or another process).

Valve Characteristics

The valves disclosed herein exhibit enhanced valve sealing characteristics, including when under load. In some embodiments, the differential in hardness between the diamond engagement surfaces and the opposing engagement surfaces and/or the relative elasticity of the opposing engagement surfaces facilitate, under sufficient load, the relative compression of the opposing engagement surfaces. The metal of the opposing engagement surface elastically deforms under loads (e.g., up to the yield point of the metal) such that the opposing bearing surface is capable of elastically compressing (also referred to as "elastically deforming") under such loads (i.e., loads within the elastic zone of the metal and below the plastic deformation zone of the metal). With the diamond engagement surface(s) engaged with and compressing into the opposing engagement surface(s), the interfacial contact between the engagement surfaces is enhanced (e.g., increased), resulting in enhanced sealing between the engagement surfaces. The present disclosure includes the strategic placement of the diamond engagement surfaces at locations within the valve (e.g., at the downstream side of the valve) where relatively higher load interfacial contacts are expected. In some embodiments, the valve is pre-loaded (e.g., via a spring) such that the interfacial contact between the diamond and metal engagement surfaces is enhanced (e.g., increased) whether or not load is provided by a fluid flowing through the valve. For example, a spring may bias the ball of the ball valve into contact with the cup of the ball valve. While the flow paths (e.g., flow paths 1301 and 1501) illustrate flow that is either active when the valve is opened (e.g., as shown in FIG. 3A) or inactive when the valve is closed (e.g., as shown in FIG. 3B), one skilled in the art would understand that fluid may flow through the valves when the valves are only partially opened.

With reference to FIGS. 3A and 3B, assuming a fluid flow direction traveling from inlet 1306 to outlet 1308, when the valve 1300 is in the closed position (as shown in FIG. 3B), fluid on the upstream side of the valve 1300 (i.e., fluid at the inlet 1306) exerts a load onto ball 1312, and ball 1312, in-turn, exerts load onto the cup 1303 at downstream side of valve 1300 (i.e., the cup 1303 at the outlet 1308). The elastic deformation of the opposing engagement surface 1304 results, under sufficient load, in the relative compression of the opposing engagement surface 1304 on the cup 1303 at the downstream side of valve 1300. In some embodiments, the diamond bearing surface 1314 is only provided on the side of the valve 1300 where relatively higher loads are expected (in comparison to the other side of the valve). For example, still assuming a fluid flow direction traveling from inlet 1306 to outlet 1308, the downstream side the ball 1312 can include the diamond engagement surface 1314, with a remainder of the ball including a different engagement surface (e.g., a steel or other metal engagement surface). In such embodiments, only the portions of the ball 1312 that engage with the cup 1303 at downstream side of valve 1300 include the diamond engagement surface 1314. In one example, half of the ball 1312 (on the downstream side of the valve 1300) includes the diamond engagement surface 1314 and the other half of the ball 1312 does not include the diamond engagement surface.

Similarly, with reference to FIGS. 5A and 5B, assuming a fluid flow direction traveling from inlet 1506 to outlet 1508, when the valve 1500 is in the closed position (as shown in FIG. 5B), fluid on the upstream side of the valve 1500 (i.e., fluid at the inlet 1506) exerts a load onto ball 1512, and ball 1512, in-turn, exerts load onto the cup 1503 at downstream side of valve 1500 (i.e., the cup 1503 at the outlet 1508). The elastic deformation of the opposing engagement surface 1504 results, under sufficient load, in the relative compression of the opposing engagement surface 1504 on the ball 1512 at the downstream side of valve 1500. In some embodiments, the diamond bearing surface 1514 is only provided on the side of the valve 1500 where relatively higher loads are expected (in comparison to the other side of the valve). For example, still assuming a fluid flow direction traveling from inlet 1506 to outlet 1508, the cup 1503 on the downstream side of the valve 1500 can include the diamond engagement surface 1514, with the other cup 1503 on the upstream side of the valve 1500 including a different engagement surface (e.g., a steel or other metal engagement surface). In such embodiments, only the cup 1503 that engages with the ball 1512 at downstream side of valve 1500 includes the diamond engagement surface 1514.

While the valves shown and described herein include hand operable valve switches (e.g., handle 1316), the valves disclosed herein are not limited to this particular form of actuation, and may include other valve actuators. The valve actuation may be electronically controlled. In some embodiments, the valve may be configured to cycle open and closed at a rate. For example, some applications may require a relatively fast cycling between the open and closed configurations of the valve (e.g., the ball may constantly or continually spin between open and closed). The use of the diamond and metal engagement surfaces disclosed herein provides for a low CoF during the opening and closing of the valves. The CoF exhibited between the diamond engagement surfaces and the opposing engagement surfaces are less than 0.1, 0.09 or less, 0.08 or less, 0.07 or less, 0.06 or less, 0.05 or less, 0.04 or less, 0.03 or less, 0.02 or less, or 0.01 or less. In some embodiments, the CoF exhibited between the diamond engagement surfaces and the opposing engagement surfaces ranges from 0.01 to 0.09, or 0.01 to 0.07, or 0.01 to 0.05, or 0.01 to 0.03, or any range or value therebetween.

Methods of Making the Diamond Surfaces

In some embodiments, the diamond bearing and engagement surfaces disclosed herein are made by a high-pressure and high-temperature process (HPHT diamonds). In some embodiments, the diamond surfaces disclosed herein are made by chemical vapor deposition (CVD) or physical vapor deposition (PVD) of a diamond layer. The thickness of the diamond layer that has the diamond surfaces may be 0.200" or less, or 0.150" or less, or 0.100" or less, or 0.09" or less, or 0.08" or less, or 0.07" or less, or 0.06" or less, or 0.05" or less, or 0.04" or less, or 0.03" or less, or 0.02" or less, 0.010" or less. The thickness of the diamond layer that has the diamond surface may be from 0.010" to 0.200", from 0.02" to 0.150", from 0.03" to 0.100", from 0.04" to 0.09", from 0.05" to 0.08", from 0.06" to 0.07", or any range or value therebetween. For example, when the diamond layer is made via CVD or PVD, the thickness of the diamond layer that has the diamond surface may be 0.010" or less, and when the diamond layer is made by a high-pressure and high-temperature process the thickness of the diamond layer that has the diamond surface may be 0.200" or less. In some embodiments, the diamond is leached, un-leached, or leached and backfilled. As an example, to make a diamond layer using the CVD process, seed diamond particles are attached to a substrate and then placed in a chamber under conditions sufficient to promote the crystalline growth of the seed diamond particles.

Applications

While the bearing assemblies disclosed herein are not limited to particular applications, some exemplary applications include as a journal bearings for an airplane propeller, bearings in a planetary gear box, marine bearings, turbo bearings, gas or steam turbine main shaft bearings, downhole pump bearings (such as an electronic submersible pump), bearings in downhole motors, driveline bearings, and roller ball bearings.

While described as applied to particular bearing geometries, the concepts described in the present disclosure are not limited to being applied to these specific bearing geometries. The concepts described in the present disclosure may be applied to axial bearings (e.g., thrust bearings), radial bearings, combined axial and radial bearings, roller ball bearings, cam followers, linear bearings, power transmission surfaces (e.g., gears and drivelines), rod guides, pipe protectors, valves, and other assemblies or machines that have moving parts with surfaces that are in sliding engagement with one another. The concepts described in the present disclosure may be applied to assemblies or machines that include two load-transmitting bearing surfaces that are slidingly engaged with one another, in which one of the load-transmitting bearing surfaces is a diamond surface and the other of the load-transmitting bearing surfaces is a metal alloy surface that contains more than 2 wt. % of a diamond solvent-catalyst.

In some embodiments, the bearing assemblies disclosed herein include hybrid bearing engagement surfaces that have different geometries and surface profiles. For example, the diamond bearing can have a first geometric shape with a first surface profile (e.g., a conical or cylindrical bearing surface) and the opposing component can have a second geometric shape with a second surface profile (e.g., a spherical bearing surface). For example, an axial bearing can include a diamond bearing surface that is planar and an opposing bearing surface that is non-planar (or vice versa).

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A split radial journal bearing assembly, the bearing assembly comprising:
a first radial journal bearing and a second radial journal bearing, each radial journal bearing having a bearing body and a radial bearing surface thereon;
a part, the part comprising a body and an opposing bearing surface on the body, wherein the part is positioned between the first and second radial journal bearing, and wherein the first and second radial journal bearings are spaced apart such that at least one gap is between the first and second radial journal bearings;
wherein the radial bearing surfaces comprise polycrystalline diamond, and wherein the opposing bearing surface comprises a metal, the metal containing at least 2 weight percent of a diamond solvent-catalyst based on a total weight of the metal;
wherein each of the radial bearing surfaces is bound by lateral boundary edges that extend about a circumference of the radial journal bearing and longitudinal boundary edges that extend along an axial extent of the radial journal bearing; and
wherein the part is rotatably engaged between the first and second radial journal bearings such that the opposing bearing surface is rotatably slidable along a radial diamond contact area of the radial bearing surfaces, and wherein the metal of the opposing bearing surface is engaged with the polycrystalline diamond along the radial diamond contact area and entirely within the lateral boundary edges of the radial bearing surfaces.

2. The bearing assembly of claim 1, wherein the radial diamond contact area of each radial bearing surface includes the longitudinal boundary edges of that radial bearing surface.

3. The bearing assembly of claim 2, wherein the longitudinal boundary edges are beveled, radiused, or honed.

4. The bearing assembly of claim 1, wherein the part is a shaft, the shaft positioned within a cavity defined between the first and second radial journal bearings.

5. The bearing assembly of claim 4, wherein the shaft is rotatably engaged within the cavity such that the opposing bearing surface is rotatably slidable along the radial bearing surfaces.

6. The bearing assembly of claim 1, wherein the radial bearing surfaces each comprise a surface of a polycrystalline diamond layer, the polycrystalline diamond layer having a thickness of 0.200" or less.

7. The bearing assembly of claim 1, wherein the metal comprises from 55 to 100 wt. % of the diamond solvent-catalyst based on the total weight of the metal.

8. The bearing assembly of claim 1, wherein the diamond solvent-catalyst comprises iron, cobalt, nickel, titanium, copper, ruthenium, rhodium, palladium, chromium, manganese, or tantalum.

9. The bearing assembly of claim 1, wherein the metal is softer than a superhard material.

10. The bearing assembly of claim 1, wherein the metal is softer than tungsten carbide (WC).

11. The bearing assembly of claim 1, wherein the metal has a hardness value of less than 25 GPa as determined in accordance with ASTM E92-17.

12. The bearing assembly of claim 1, wherein a coefficient of friction between the radial bearing surfaces and the opposing bearing surface is 0.09 or less.

13. The bearing assembly of claim 1, wherein the metal has a hardness value of less than 15 GPa as determined in accordance with ASTM E92-17.

14. The bearing assembly of claim 1, wherein the diamond-solvent catalyst comprises iron.

15. The bearing assembly of claim 1, wherein the diamond-solvent catalyst comprises cobalt.

16. The bearing assembly of claim 1, wherein the diamond-solvent catalyst comprises nickel.

17. The bearing assembly of claim 1, wherein the diamond-solvent catalyst comprises titanium.

18. The bearing assembly of claim 1, wherein the diamond-solvent catalyst comprises copper.

19. The bearing assembly of claim 1, wherein the diamond-solvent catalyst comprises ruthenium.

20. The bearing assembly of claim 1, wherein the diamond-solvent catalyst comprises rhodium.

21. The bearing assembly of claim 1, wherein the diamond-solvent catalyst comprises palladium.

22. The bearing assembly of claim 1, wherein the diamond-solvent catalyst comprises chromium.

23. The bearing assembly of claim 1, wherein the diamond-solvent catalyst comprises manganese.

24. The bearing assembly of claim 1, wherein the diamond-solvent catalyst comprises tantalum.

25. The bearing assembly of claim 1, wherein the polycrystalline diamond has a surface finish of 20 μin Ra or less.

26. The bearing assembly of claim 1, wherein the opposing bearing surface has a lateral width that is less than a lateral width of each of the radial bearing surfaces.

27. The bearing assembly of claim 1, wherein a surface area of the opposing bearing surface is less than a surface area of each of the radial bearing surfaces.

28. The bearing assembly of claim 1, wherein the radial diamond contact area of each radial journal bearing comprises less than an entirety of a surface area of the radial bearing surface of that radial journal bearing.

29. A bearing assembly, the bearing assembly comprising:
a bearing having a bearing body;
a part having a part body;
wherein the part body has a metal bearing surface thereon, wherein the bearing body has a plurality of polycrystalline diamond bearing elements thereon, each polycrystalline diamond bearing element has a diamond bearing surface that is bound by lateral boundary edges that extend about a circumference of the bearing and longitudinal boundary edges that extend along an axial extent of the bearing, and wherein the metal bearing surface comprises a metal, the metal containing at least 2 weight percent of a diamond solvent-catalyst based on a total weight of the metal; and
wherein the polycrystalline diamond bearing elements are arranged contiguously such that adjacent polycrystalline diamond bearing elements are in contact at longitudinal boundary edges of the adjacent polycrystalline diamond bearing elements, and such that the bearing surfaces of the adjacent polycrystalline diamond bearing elements are flush at the longitudinal boundary edges;
wherein the part is rotatably engaged with the bearing such that the metal bearing surface is engaged with the diamond bearing surfaces of the plurality of polycrystalline diamond bearing elements along a radial diamond contact area that is entirely within the lateral boundary edges of the diamond bearing surfaces.

30. The bearing assembly of claim 29, wherein the plurality of polycrystalline diamond bearing elements form a substantially continuous surface.

31. The bearing assembly of claim 29, wherein the diamond contact area includes the longitudinal boundary edges of the polycrystalline diamond bearing elements.

32. The bearing assembly of claim 29, wherein the boundary edges are beveled, radiused, or honed.

33. The bearing assembly of claim 29, wherein the part is a shaft, the shaft positioned within a cavity of the bearing.

34. The bearing assembly of claim 33, wherein the shaft is axially slidable within the cavity such that the metal bearing surface is axially slidable along the polycrystalline diamond bearing elements.

35. The bearing assembly of claim 29, wherein the polycrystalline diamond bearing elements each comprise a polycrystalline diamond layer, the polycrystalline diamond layer having a thickness of 0.200" or less.

36. The bearing assembly of claim 29, wherein the metal comprises from 55 to 100 wt. % of the diamond solvent-catalyst based on the total weight of the metal.

37. The bearing assembly of claim 29, wherein the diamond solvent-catalyst comprises iron, cobalt, nickel, titanium, copper, ruthenium, rhodium, palladium, chromium, manganese, or tantalum.

38. The bearing assembly of claim 29, wherein the metal is softer than a superhard material.

39. The bearing assembly of claim 29, wherein the metal is softer than tungsten carbide (WC).

40. The bearing assembly of claim 29, wherein the metal has a hardness value of less than 25 GPa as determined in accordance with ASTM E92-17.

41. The bearing assembly of claim 29, wherein the metal has a hardness value of less than 15 GPa as determined in accordance with ASTM E92-17.

42. The bearing assembly of claim 29, wherein a coefficient of friction between the polycrystalline diamond bearing elements and the metal bearing surface is 0.09 or less.

43. The bearing assembly of claim 29, wherein each polycrystalline diamond bearing element has a surface finish of 20 μin Ra or less.

44. A split radial journal bearing assembly, the bearing assembly comprising:
a first radial journal bearing and a second radial journal bearing, each radial journal bearing having a bearing body and a radial bearing surface thereon;
a part, the part comprising a body and an opposing bearing surface on the body, wherein the part is positioned between the first and second radial journal bearing, and wherein the first and second radial journal bearings are spaced apart such that at least one gap is between the first and second radial journal bearings;
wherein the radial bearing surfaces comprise polycrystalline diamond, and wherein the opposing bearing surface comprises a metal, wherein the metal is steel and contains at least 2 weight percent of a diamond solvent-catalyst based on a total weight of the metal;
wherein each of the radial bearing surfaces is bound by lateral boundary edges that extend about a circumference of the radial journal bearing and longitudinal boundary edges that extend along an axial extent of the radial journal bearing;
wherein the part is rotatably engaged between the first and second radial journal bearings such that the opposing bearing surface is rotatably slidable along a radial diamond contact area of the radial bearing surfaces, and wherein the metal of the opposing bearing surface is engaged with the polycrystalline diamond along the radial diamond contact area and entirely within the lateral boundary edges of the radial bearing surfaces.

45. The bearing assembly of claim 44, wherein the longitudinal boundary edges are beveled, radiused, or honed.

46. A bearing assembly, the bearing assembly comprising:
a bearing having a bearing body;
a part having a part body;
wherein the part body has a metal bearing surface thereon, wherein the bearing body has a plurality of polycrystalline diamond bearing elements thereon, each polycrystalline diamond bearing element has a diamond bearing surface that is bound by lateral boundary edges that extend about a circumference of the bearing and longitudinal boundary edges that extend along an axial extent of the bearing, and wherein the metal bearing surface comprises a metal, wherein the metal is steel and contains at least 2 weight percent of a diamond solvent-catalyst based on a total weight of the metal; and wherein the polycrystalline diamond bearing elements are arranged contiguously such that adjacent polycrystalline diamond bearing elements are in contact at longitudinal boundary edges of the adjacent polycrystalline diamond bearing elements, and such that the bearing surfaces of the adjacent polycrystalline diamond bearing elements are flush at the longitudinal boundary edges;

wherein the part is rotatably engaged with the bearing such that the metal bearing surface is engaged with the diamond bearing surfaces of the plurality of polycrystalline diamond bearing elements along a radial diamond contact area that is entirely within the lateral boundary edges of the diamond bearing surfaces.

47. The bearing assembly of claim 46, wherein the longitudinal boundary edges are beveled, radiused, or honed.

48. A method of providing a bearing on a part, the method comprising:

positioning a first radial journal bearing and a second radial journal bearing relative to the part, such that the part is positioned between and rotatably engaged with the first and second radial journal bearings, wherein the first and second radial journal bearings are spaced apart such that at least one gap is between the first and second radial journal bearings;

wherein radial bearing surfaces of the radial journal bearings comprise polycrystalline diamond, and wherein an opposing bearing surface of the part comprises a metal, the metal containing at least 2 weight percent of a diamond solvent-catalyst based on a total weight of the metal;

wherein each radial bearing surface is bound by lateral boundary edges that extend about a circumference of the radial journal bearing and longitudinal boundary edges that extend along an axial extent of the radial journal bearing;

engaging the metal with the polycrystalline diamond; and rotating the part and the radial journal bearings relative to one another such that the metal slides along a radial diamond contact area of the polycrystalline diamond of each radial bearing surface entirely within the lateral boundary edges of each radial bearing surface.

\* \* \* \* \*